United States Patent [19]

Kobayashi et al.

[11] Patent Number: 4,539,942
[45] Date of Patent: Sep. 10, 1985

[54] INTERNAL COMBUSTION ENGINE COOLING SYSTEM AND METHOD OF OPERATION THEREOF

[75] Inventors: Hideo Kobayashi; Takao Kashiwagi; Kunimasa Yoshimura; Hisao Mae, all of Toyota, Japan

[73] Assignee: Toyota Jidosha Kabushiki Kaisha, Toyota, Japan

[21] Appl. No.: 662,052

[22] Filed: Oct. 18, 1984

[30] Foreign Application Priority Data

Nov. 25, 1983 [JP] Japan .................................. 58-221521

[51] Int. Cl.³ .............................. F01P 3/04; F01P 5/02
[52] U.S. Cl. .................................. 123/41.1; 123/11.12; 123/41.29; 123/41.44; 123/41.49; 123/41.82 R
[58] Field of Search ............... 123/41.02, 41.08, 41.09, 123/41.1, 41.11, 41.12, 41.29, 41.44, 41.47, 41.49, 41.82 R

[56] References Cited

U.S. PATENT DOCUMENTS

| | | | |
|---|---|---|---|
| 4,369,738 | 1/1983 | Hirayama | 123/41.29 |
| 4,378,760 | 4/1983 | Barge | 123/41.49 |
| 4,381,736 | 5/1983 | Hirayama | 123/41.1 |
| 4,413,596 | 11/1983 | Hirayama | 123/41.1 |
| 4,423,705 | 1/1984 | Morita et al. | 123/41.29 |
| 4,425,766 | 1/1984 | Claypole | 123/41.12 |
| 4,475,485 | 10/1984 | Sakakibara et al. | 123/41.1 |

Primary Examiner—William A. Cuchlinski, Jr.
Attorney, Agent, or Firm—Oblon, Fisher, Spivak, McClelland & Maier

[57] ABSTRACT

An engine has cylinder head and cylinder block cooling jackets. A control system controls a valve system to circulate fluid through a conduit system, the jackets and a radiator in various flow patterns. If the block jacket cooling fluid temperature is less than a warmup completion temperature, the control system establishes a combined conduit circuit including both the head and the block cooling jacket but not including the radiator, and makes a cooling fan system for the radiator blow relatively weakly. If the block jacket cooling fluid temperature is greater than the warmup completion temperature, then, if it is less than an overheating temperature higher than that, the control system establishes two substantially separate conduit circuits, one including the head cooling jacket and the radiator, and the other including the block cooling jacket but not the radiator; but, if it is greater, the control system establishes a combined conduit circuit including both the head and block cooling jacket and also the radiator. If the block jacket cooling fluid temperature is greater than a block fan trigger temperature equal to or slightly higher than the warmup completion temperature, then: if the head jacket cooling fluid temperature is less than a head fan trigger temperature less than the warmup completion temperature, the control system makes the fan system blow relatively weakly; while, if the head jacket cooling fluid temperature is greater than this head fan trigger temperature, the control system makes the fan system blow relatively strongly.

20 Claims, 8 Drawing Figures

INTERNAL COMBUSTION ENGINE COOLING SYSTEM AND METHOD OF OPERATION THEREOF

BACKGROUND OF THE INVENTION

The present invention relates to a cooling system for an internal combustion engine and to a method of operation thereof, and more particularly relates to such a cooling system and method of operation thereof for a spark ignition internal combustion engine, said cooling system being of a so called double circuit type.

There is a per se well known type of so called double circuit cooling system for an internal combustion engine, in which the cooling jacket in the cylinder head of the engine and the cooling jacket in the cylinder block are interconnected with each other and with a radiator by a conduit system controlled by a system of control valves, and in which, according to selective and appropriate operation of these control valves, the following three types of cooling fluid circuit can be established: (a) when the temperature of the cooling fluid in the block cooling jacket is less than a certain predetermined so called engine warming up temperature value, a so called engine warming up circuit, in which cooling fluid is circulated both through said head cooling jacket and said block cooling jacket (typically in series), but not substantially through said radiator, so that the cooling fluid flows through these two jackets can mix but are not substantially cooled by said radiator; (b) when the temperature of the cooling fluid in said block cooling jacket is greater than said certain predetermined so called engine warming up temperature value but is less than a certain predetermined engine overheating temperature value which is higher than said engine warming up temperature value, a so called separated circulation circuit, in which cooling fluid is circulated around two substantially separate flow paths, one including said head cooling jacket and said radiator, and the other including said block cooling jacket without substantially including said radiator, so that the cooling fluid flows through these two jackets substantially cannot mix; and (c) when the temperature of the cooling fluid in said block cooling jacket is greater than said predetermined engine overheating temperature value, a so called overheat prevention circuit, in which cooling fluid is circulated both through said head cooling jacket and said block cooling jacket (typically in series), and also substantially through said radiator. Such a double circuit cooling system for an internal combustion engine has been proposed, for example, in Japanese Patent Application Ser. No. 55-52025 (1980)(which has been published as Japanese Laying Open Publication Ser. No. 56-148610), Japanese Patent Application Ser. No. 55-68036 (1980) (which has been published as Japanese Laying Open Publication Ser. No. 56-165713), Japanese Patent Application Ser. No. 55-169933 (1980) (which has been published as Japanese Laying Open Publication Ser. No. 57-93620) and Japanese Patent Application Ser. No. 58-90544 (1983), all of which patent applications are assigned to the same assignee as is Japanese Patent Application Ser. No. 221521/83 of which priority is being claimed in the present application.

The effect of the provision of such a double circuit cooling system for an internal combustion engine is as follows. In the case (a) above, in which the temperature of the cooling fluid in the block cooling jacket is less than said engine warming up temperature value, the establishment of the engine warming up circuit in which cooling fluid is circulated both through said head cooling jacket and said block cooling jacket but not substantially through said radiator, with said cooling fluid flows through these two jackets being able to mix but not being substantially cooled by said radiator, means that the temperature rise of the cooling fluid flowing through the block cooling jacket is accelerated, which thus causes the speed of the engine warming up as a whole to be increased as compared with the type of case in which during this engine warming up process the cooling fluid flows in the head cooling jacket and the block cooling jacket are kept separate. Accordingly, the temperature rise of the lubricant in the cylinder block of the engine, which is strongly affected by the temperature of the cooling fluid in said block cooling jacket, is made more quick; and this is beneficial with regard to improving the quality of exhaust emissions of the engine during the warming up operational stage, which in fact is a critical operational stage from the point of view of exhaust emission control. Next, in the case (b) above, in which the temperature of the cooling fluid in said block cooling jacket is greater than said engine warming up temperature value but is less than said engine overheating temperature value, the establishment of the separated circulation circuit in which cooling fluid is circulated around two substantially separate flow paths, one including said head cooling jacket and said radiator and the other including said block cooling jacket without substantially including said radiator, with said cooling fluid flows through these two jackets substantially not being able to mix, means that the cylinder head of the engine is forcibly cooled to a much greater extent at this time than is the cylinder block, which is beneficial with regard to increasing the mechanical octane value of the engine and with regard to avoiding knocking and pinking thereof, and with regard to increasing the performance and the fuel efficiency thereof. Finally, in the case (c) above, in which the temperature of the cooling fluid in said block cooling jacket is greater than said predetermined engine overheating temperature value, the establishment of the overheat prevention circuit in which cooling fluid is circulated both through said head cooling jacket and said block cooling jacket and also substantially through said radiator means that the cooling effect of the radiator is utilized to the maximum possible amount for the engine, thus preventing any overheating. Thereby, by the provision of this double circuit cooling system, the cooling of the internal combustion engine is appropriately performed in all its operational conditions according to the temperature of the cooling fluid thereof, and, without delaying the warming up of the engine, without any risk of occurrence of overheating of the engine, and without deteriorating the quality of the exhaust emissions of the engine, the mechanical octane value is maximized, thus providing good performance and fuel economy.

Such a cooling system, and such a method of operation thereof, are beneficial, but certain questions and problems remain to be resolved. In particular, in such a cooling system, typically a cooling fan or fans are also used to blow air at the radiator. Such a cooling fan system may either be powered from the crankshaft of the engine, optionally via some form of clutching device, or electrically by an electric motor. In either of these cases, since actually such a cooling fan system is not required to blow air at the radiator during all operational circumstances (for example, when no cooling fluid is being passed through the radiator, no draft therefor is required), if the cooling fan system is in fact being powered at all times, power is wasted: either mechanical power in the case that the fan system is mechanically powered from the engine crankshaft, or electrical power in the case that the fan system is electrically powered. Further, there is a risk that in some circumstances the engine may be overcooled.

In principle, the cooling fan system of such an engine should be operated (during the engine warmed up state) only when the temperature of the cooling fluid circulating through the cooling jacket of the cylinder head of the engine is higher than a certain fan system trigger temperature value. This fan system trigger temperature value should be set substantially less than said engine warmup completion temperature in order to keep the cylinder head of the engine at a much lower temperature than the cylinder block as explained above. Now, if it were conceived of to control the cooling fan system only according to the temperature of the cooling fluid circulating through the cooling jacket of the cylinder block of the engine, the problem arises that the cooling fan system might be unnecessarily operated once the block cooling fluid temperature reached its reference trigger value, even though the head cooling fluid temperature was not properly high; or in an extreme case even while the engine warming up circuit was being provided. Further, in the case that the cooling fluid circulating through the cooling jacket of the cylinder block of the engine is partially diverted for supplying heat to a heater core of a heater for the passenger compartment of the vehicle incorporating the internal combustion engine, which is typically the case, it may occur during cold or winter exterior weather conditions that, when the engine is idling or running under light load and the separated circulation circuit of case (b) above is being provided by the cooling system, only by the operation of the passenger compartment heater, enough heat is removed from the cylinder block cooling fluid circuit of the engine to cause the temperature of the cooling fluid in said block cooling jacket to drop below said engine warming up temperature value, so that the engine warming up circuit of case (a) described above comes to be provided. When this happens, the temperature of the cooling fluid in said block cooling jacket temporarily abruptly rises, due to the sudden mixing of the cooling fluid in said block cooling jacket therewith; and, if the cooling fan system were controlled as suggested above only according to the temperature of the cooling fluid circulating through the cooling jacket of the cylinder block of the engine, then at this time point said cooling fan system could very likely be operated unnecessarily, which would be disadvantageous and would impair the operation of the passenger compartment heater, as well as perhaps overcooling the engine.

SUMMARY OF THE INVENTION

Accordingly, it is the primary object of the present invention to provide a cooling system for an internal combustion engine, which includes certain cooling fluid control valves and a cooling fan and a radiator, and in which said cooling fan and said control valves are properly controlled so as to provide proper circulation of cooling fluid as appropriate to the current engine operational conditions, and a draft of air for said radiator when and only when appropriate.

It is a further object of the present invention to provide such a cooling system, which during its operation substantially always operates said cooling fan when appropriate.

It is a further object of the present invention to provide such a cooling system, which during its operation substantially completely prevents unnecessary operation of said cooling fan.

It is a further object of the present invention to provide such a cooling system, which during its operation does not waste any power on unnecessary operation of said cooling fan.

It is a further object of the present invention to provide such a cooling system, which during its operation does not cause any substantial risk of overcooling of the engine.

It is a further object of the present invention to provide such a cooling system, which during its operation does not incur any risk of poor operation of a passenger compartment heater which is supplied with heat by the engine cooling fluid.

It is a further object of the present invention to provide such a cooling system, which during its operation does not incur any unnecessary mechanical loss in the operation of the engine.

It is a further object of the present invention to provide such a cooling system, which during its operation promotes quick warming up of the engine.

It is a further object of the present invention to provide such a cooling system, which during its operation particularly accelerates the warming up of the cylinder block of the engine.

It is a further object of the present invention to provide such a cooling system, which during its operation particularly promotes quick warming up of the lubricant in the crankcase of the engine.

It is a further object of the present invention to provide such a cooling system, which during its operation reduces the emission of undesirable pollutants in the exhaust gases of the engine, especially during the warming up stage of engine operation, but also during other operational conditions.

It is a further object of the present invention to provide such a cooling system, which during its operation reduces mechanical wear on the component parts of the engine.

It is a further object of the present invention to provide such a cooling system, which during its operation strongly cools the cylinder head of the engine.

It is a further object of the present invention to provide such a cooling system, which during its operation does not very strongly cool the cylinder block of the engine.

It is a yet further object of the present invention to provide such a cooling system, which during its operation keeps the mechanical octane value of the engine high.

It is a yet further object of the present invention to provide such a cooling system, which during its operation causes the engine to have no tendency towards knocking or pinking.

It is a yet further object of the present invention to provide such a cooling system, which during its operation causes the engine to have good fuel economy.

It is a yet further object of the present invention to provide such a cooling system, which during its operation causes the engine to have good performance.

It is a yet further object of the present invention to provide such a cooling system, which during its operation is particularly effective at guarding against overheating of the engine.

It is a yet further object of the present invention to provide such a cooling system, which is simple and reliable in its construction.

It is a yet further object of the present invention to provide such a cooling system, which is cheap.

It is a further, and concomitant, object of the present invention to provide a method of operating a cooling system for an internal combustion engine, which accomplishes any or all of the above mentioned objects.

According to the most general apparatus aspect of the present invention, these and other objects are accomplished by a cooling system, for an internal combustion engine cooled by flow of cooling fluid and comprising a cylinder head and a cylinder block, comprising: (a) a cylinder head cooling jacket through which cooling fluid circulates to cool said cylinder head; (b) a cylinder block cooling jacket through which cooling fluid circulates to cool said cylinder block; (c) a radiator; (d) a cooling fan system for blowing air at said radiator; (e) a fan system control system which controls said cooling fan system so that it blows air at said radiator either at a relatively high flow amount or at a relatively low flow amount; (f) a cooling fluid conduit system for circulating cooling fluid through said head cooling jacket, said block cooling jacket, and said radiator in various selectable flow patterns; (g) a control valve system for thus selectably controlling said circulating flow of cooling fluid in said cooling fluid conduit system; and (h) a control system for: (h1) if the temperature of the cooling fluid in said block cooling jacket is less than a certain predetermined engine warmup completion temperature value, so controlling said control valve system as to circulate cooling fluid through a combined circuit of said cooling fluid conduit system including both said head cooling jacket and said block cooling jacket but not substantially including said radiator, and meanwhile so controlling said cooling fan system, via said fan system control system, as to cause said cooling fan system to blow air at said radiator at said relatively low flow amount; (h2) if the temperature of the cooling fluid in said block cooling jacket is greater than said predetermined engine warmup completion temperature value, then: (h21) if the temperature of the cooling fluid in said block cooling jacket is less than a certain predetermined engine overheating temperature value which is higher than said predetermined engine warmup completion temperature value, so controlling said control valve system as to circulate cooling fluid through two substantially separate circuits of said cooling fluid conduit system, one including said head cooling jacket and said radiator, and the other including said block cooling jacket without substantially including said radiator; (h22) if the temperature of the cooling fluid in said block cooling jacket is greater than said predetermined engine overheating temperature value, so controlling said control valve system as to circulate cooling fluid through a combined circuit of said cooling fluid conduit system including said head cooling jacket and said block cooling jacket and also substantially including said radiator; and (h3) if the temperature of the cooling fluid in said block cooling jacket is greater than a predetermined block fan system trigger temperature value which is equal to or slightly higher than said predetermined engine warmup completion temperature value, then: (h31) if the temperature of the cooling fluid in said head cooling jacket is less than a certain predetermined head fan system trigger temperature value which is less than said predetermined engine warmup completion temperature value, so controlling said cooling fan system, via said fan system control system, as to cause it to blow air at said radiator at said relatively low flow amount; and (h32) if the temperature of the cooling fluid in said head cooling jacket is greater than said predetermined head fan system trigger temperature value, so controlling said cooling fan system, via said fan system control system, as to cause it to blow air at said radiator at said relatively high flow amount.

According to such a structure, since, when the temperature of the cooling fluid in said block cooling jacket is less than said certain predetermined engine warmup completion temperature value, said control system is so controlling said control valve systemm as to circulate cooling fluid through said combined circuit of said cooling fluid conduit system including both said head cooling jacket and said block cooling jacket but not substantially including said radiator and is also so controlling said cooling fan system, via said fan system control system, as to cause said cooling fan system to blow air at said radiator at said relatively low flow amount (which may be a zero flow amount), therefore in these circumstances the internal combustion engine is warmed up at the maximum possible amount, by the cooling fluid in the head cooling jacket and the block cooling jacket being circulated between them so as to mix, but not being circulated through the radiator and thus not substantially being cooled, and this is beneficial with regard to the quality of the exhaust emissions of the engine during this particularly crucial warming up period; and particularly also during this warming up time the cooling fan system is being operated at its low flow amount (i.e. typically is not being operated), which saves engine power and increases engine efficiency; and, advantageously, this is the case even if the temperature of the cooling fluid in the cylinder head rises to be quite high. However, when the temperature of the cooling fluid in said block cooling jacket comes to be greater than said predetermined engine warmup completion temperature value, this is an indication that the internal combustion engine has warmed up. At this time, provided that the temperature of the cooling fluid in said block cooling jacket is greater than a predetermined block fan system trigger temperature value which is equal to or slightly higher than said predetermined engine warmup completion temperature value, then if the temperature of the cooling fluid in said head cooling jacket is less than a certain predetermined head fan system trigger temperature value which is less than said predetermined engine warmup completion temperature value, the control system so controls said cooling fan system, via said fan system control system, as to cause it to blow air at said radiator at said relatively low flow amount; whereas, on the other hand, if the temperature of said cooling fluid in said head cooling jacket is higher than said certain predetermined head fan system trigger temperature value, the control system so controls said cooling fan system as to cause it to blow air at said radiator at said relatively high flow amount. Thereby, the temperature of said cooling fluid in said head cooling jacket, and thus of said cylinder head, is kept to be substantially at said head fan system trigger temperature value; and this is done by selectively operating said fan system at said high and said low flow amounts, and by only operating said fan system at said high flow amount, when its such operation is really required. Again, this is beneficial for minimizing use of power for driving said fan system, which thus promotes engine performance and fuel economy; and the keeping of the cylinder head at this relatively low head fan system trigger temperature ensures that the engine has a high mechanical octane value, and helps to guard the engine against pinking and detonation.

According to the most general method aspect of the present invention, these and other objects are accomplished by a method of operating a cooling system, for an internal combustion engine cooled by flow of cooling fluid and comprising a cylinder head and a cylinder block, comprising (a) a cylinder head cooling jacket through which cooling fluid circulates to cool said cylinder head; (b) a cylinder block cooling jacket through which cooling fluid circulates to cool said cylinder block; (c) a radiator; (d) a cooling fan system for blowing air at said radiator; (e) a fan system control system which controls said cooling fan system so that it blows air at said radiator either at a relatively high flow amount or at a relatively low flow amount; (f) a cooling fluid conduit system for circulating cooling fluid through said head cooling jacket, said block cooling jacket, and said radiator in various selectable flow patterns; and (g) a control valve system for thus selectably controlling said circulating flow of cooling fluid in said cooling fluid conduit system; said method comprising the processes, simultaneously performed, of: (h) if the temperature of the cooling fluid in said block cooling jacket is less than a certain predetermined engine warmup completion temperature value, so controlling said control valve system as to circulate cooling fluid through a combined circuit of said cooling fluid conduit system including both said head cooling jacket and said block cooling jacket but not substantially including said radiator; but if the temperature of the cooling fluid in said block cooling jacket is greater than said predetermined engine warmup completion temperature value: (h1) if the temperature of the cooling fluid in said block cooling jacket is less than a certain predetermined engine overheating temperature value which is higher than said predetermined engine warmup completion temperature value, so controlling said control valve system as to circulate cooling fluid through two substantially separate circuits of said cooling fluid conduit system, one including said head cooling jacket and said radiator, and the other including said block cooling jacket without substantially including said radiator; or (h2) if the temperature of the cooling fluid in said block cooling jacket is greater than said predetermined engine overheating temperature value, so controlling said control valve system as to circulate cooling fluid through a combined circuit of said cooling fluid conduit system including said head cooling jacket and said block cooling jacket and also substantially including said radiator; and (i) if the temperature of the cooling fluid in said block cooling jacket is less than a predetermined block fan system trigger temperature value which is equal to or slightly higher than said predetermined engine warmup completion temperature value, then so controlling said cooling fan system, via said fan system control system, as to cause said cooling fan system to blow air at said radiator at said relatively low flow amount; but if the temperature of the cooling fluid in said block cooling jacket is greater than said predetermined block fan system trigger temperature value, then: (i1) if the temperature of the cooling fluid in said head cooling jacket is less than a certain predetermined head fan system trigger temperature value which is lower than said predetermined engine warmup completion temperature value, so controlling said cooling fan system, via said fan system control system, as to cause it to blow air at said radiator at said relatively low flow amount; or (i2) if the temperature of the cooling fluid in said head cooling jacket is greater than said predetermined head fan system trigger temperature value, so controlling said cooling fan system, via said fan system control system, as to cause it to blow air at said radiator at said relatively high flow amount.

According to such a method, the advantages detailed above with regard to the most general apparatus aspect of the present invention, which is implementing such a method and whose benefits depend thereon, will be achieved in like and parallel manner; description of these advantages is therefore omitted herein, in order to avoid redundancy of explanation.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

Figure 1:
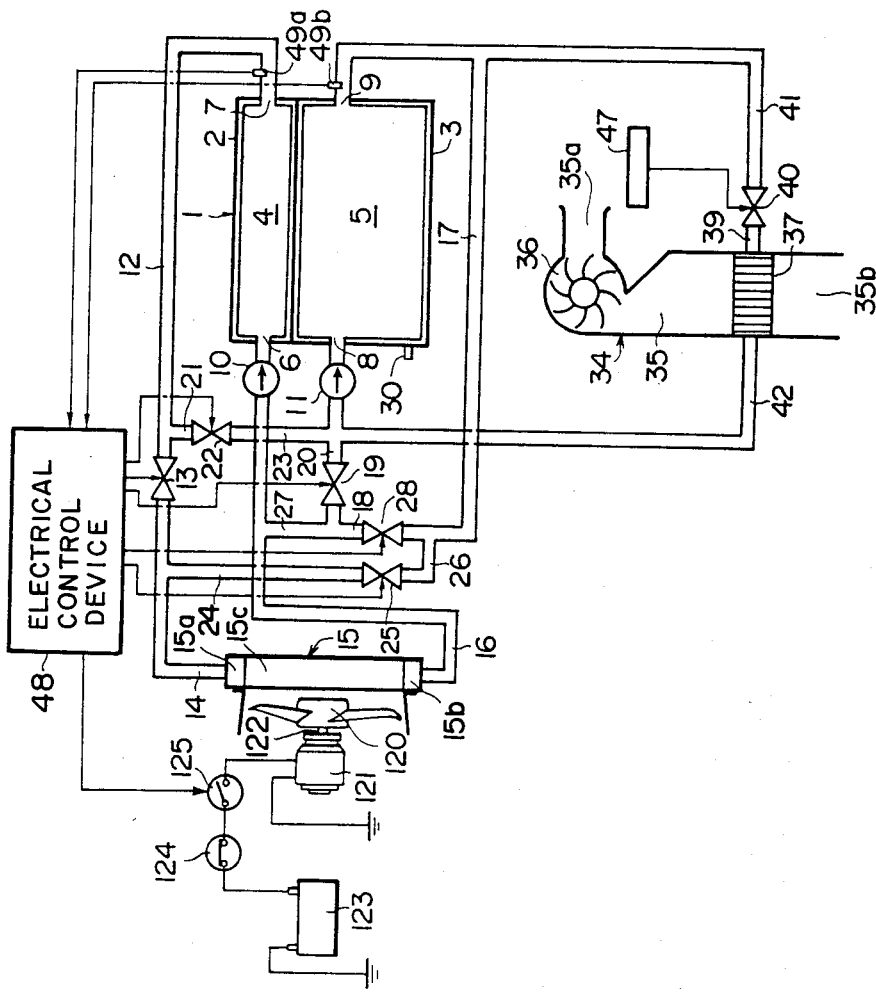
FIG. 1 is a schematic illustration of a first preferred embodiment of the cooling system of the present invention and of an internal combustion engine associated therewith, in which first preferred embodiment an electrically driven cooling fan is subjected to ON/OFF control.

The present invention will now be described with reference to the preferred embodiments thereof, and with reference to the appended drawings. FIG. 1 shows the first preferred embodiment of the cooling system of to the present invention, along with an internal combustion engine 1 which is being cooled by the operation thereof; the reference numeral 30 denotes the crankshaft of this engine 1. This engine 1 is suitable for the application of the present invention, being of a spark ignition type, and has a number of cylinders (not shown) in which are defined combustion chambers. The engine 1 has a cylinder head 2 which defines the head portions of these combustion chambers and a cylinder block 3 which defines their side wall portions; and the cooling fluid passages in the cylinder head 2 form a head cooling jacket 4 which has a cooling fluid inlet 6 and a cooling fluid outlet 7, while the cooling fluid passages in the cylinder block 3 form a block cooling jacket 5 which has a cooling fluid inlet 8 and a cooling fluid outlet 9, flow of cooling fluid through which can occur substantially separately from flow of cooling fluid through the head cooling jacket 4.

The cooling fluid outlet of a head cooling fluid circulation pump 10, which may be of a conventional type and is always rotationally driven by the crankshaft 30 of the engine 1 by a power transmission device which is not shown in the figures, is connected to the inlet 6 of the head cooling jacket 4; and similarly the cooling fluid outlet of a block cooling fluid circulation pump 11, which may be of a similar conventional type, is connected to the inlet 8 of the block cooling jacket 5. The outlet 7 of the head cooling jacket 4 is connected to the upstream end of a conduit 12, the downstream end of which is connected to the inlet of an electromagnetically actuated control valve 13, which may be of any of several per se well known conventional types. The outlet of this control valve 13 is connected to the upstream end of a conduit 15, the downstream end of which is connected to a header or intake tank 15a of a radiator 15. This radiator 15 is of a per se well known type, and incorporates a radiator matrix 15c which is connected at its upper side to said header tank 15a and at its lower side to an outlet or bottom tank 15b; a cooling fan 120, mounted on the power output shaft 122 of an electric motor 121, is provided for directing a forced draft of air at said radiator matrix 15c, so as to supplement the natural flow of air received by said radiator matrix 15c as the vehicle incorporating this system runs along the road. The upstream end of a conduit 16 is connected to said bottom tank 15b of said radiator 15, and the downstream end of said conduit 16 is connected to the inlet of said head cooling fluid circulation pump 10.

The outlet 7 of the block cooling jacket 5 is connected to the upstream end of a conduit 17, the downstream end of which is connected to the inlet of an electromagnetically actuated control valve 28, which may be similar to the control valve 13. The outlet of this control valve 28 is connected to the upstream end of a conduit 18, the downstream end of which is connected to the inlet of another electromagnetically actuated control valve 19, which may be similar to the control valves 13 and 28. The outlet of this control valve 19 is connected to the upstream end of a conduit 20, the downstream end of which is connected to the inlet of the block cooling fluid circulation pump 11. An intermediate point on the conduit 12 is connected to one end of a conduit 21, the other end of which is connected to one port of another similar electromagnetically actuated control valve 22; the other port of this control valve 22 is connected to one end of a conduit 23, the other end of which is connected to an intermediate point on the conduit 20. An intermediate point on the conduit 17 is connected to one end of a conduit 26, the other end of which is connected to one port of another similar electromagnetically actuated control valve 25; the other port of this control valve 25 is connected to one end of a conduit 24, the other end of which is connected to an intermediate point on the conduit 14. Further, an intermediate point on the conduit 16 is connected to an intermediate point on the conduit 18 via a conduit 27.

An intermediate point on the conduit 17 is connected to the upstream end of a conduit 41, the downstream end of which is connected to the inlet of a control valve 40 which is not necessarily, in this embodiment, an electrically actuated valve. The outlet of this control valve 40 is connected to the upstream end of a conduit 39, the downstream end of which is connected to the inlet of a heat exchanger 37 of a vehicle passenger compartment heater assembly 34. The outlet of this heat exchanger 37 is connected to the upstream end of a conduit 42, the downstream end of which is connected to an intermediate point on the conduit 20 (in fact, the same intermediate point to which the end of the conduit 23 is connected, but this is not functionally important). The heater assembly 34 has a shroud which defines an air duct 35 which has an intake 35a and an outlet 35b; and a blower fan 36 is provided for forcing air through this air duct 35 and through the heat exchanger 37 to heat it. A valve control device 47, typically adapted to be manually controlled by the hand of an operator, is provided for controlling the opening and closing of the control valve 40; and a blower fan control device, not shown but conveniently associated with the valve control device 47, is provided for selectively energizing the blower fan 36. The air outlet 35b opens to the interior of the passenger compartment of the vehicle incorporating this system for supplying air thus heated thereto, when the valve control device 47 is operated to open the control valve 40 and also (optionally) the blower fan 36 is operated, in a per se well known way.

The electric motor 121 is selectively supplied with actuating electrical energy from a battery 123 of the vehicle via the series combination of the accessories circuit of an ignition switch 124 of the vehicle and a ON/OFF relay switch 125. A head cooling fluid temperature sensor 49a, which provides an electrical output signal indicative of the temperature of the cooling fluid surrounding a sensor element thereof, is mounted in the conduit 12 close to the upstream end thereof, i.e. close to the cooling fluid outlet 7 of the head cooling jacket 4; and a similar block cooling fluid temperature sensor 49b is mounted in the conduit 17 close to the upstream end thereof, i.e. close to the cooling fluid output 9 of the block cooling jacket 5.

The output electrical signals of these two temperature sensors 49a and 49b are sent to an electrical control device 48, which in this first preferred embodiment of the cooling system of the present invention incorporates a microcomputer. This electrical control device 48 provides electrical output signals which actuate the control valves 13, 19, 22, 25, and 28, and also provides an ON/OFF electrical output signal which actuates the ON/OFF relay switch 125. The operational characteristics of this electrical control device 48, in this first preferred embodiment, are as follows.

The electrical control device 48, based upon the temperature of the cooling fluid which is flowing out from the block cooling jacket 5 through the outlet 9 as detected by the block cooling fluid temperature sensor 49b, controls the five electromagnetically actuated control valves 13, 19, 22, 25, and 28 in the following way: if the cooling fluid temperature detected by said sensor 49b is less than a so called engine warmup completion temperature, for example 80° C. (i.e. when the engine 1 is still cold), then said electrical control device 48 fully closes the control valves 13, 19, and 25, while it fully opens the control valves 22 and 28; if the cooling fluid temperature detected by said sensor 49b is greater than said engine warmup completion temperature but is less than a so called engine overheating temperature, for example 95° C. (i.e. when the engine 1 has been substantially warmed up), then said electrical control device 48 fully opens the control valves 13, 19, and 28, and fully closes the control valves 22 and 25; if the cooling fluid temperature detected by said sensor 49b is greater than said engine overheating temperature, but has not continuously been greater than said engine overheating temperature for longer than a certain predetermined time period (i.e. when the engine 1 is starting to overheat), then said electrical control device 48 fully opens the control valves 13 and 19, fully closes the control valve 22, and partially opens the control valves 25 and 28; while, on the other hand, if the cooling fluid temperature detected by said sensor 49b has remained greater than said engine overheating temperature for longer than said certain predetermined time period (i.e. when the engine 1 is seriously overheated), then said electrical control device 48 keeps the control valves 13 and 19 fully opened, keeps the control valve 22 fully closed, fully opens the control valve 25, and fully closes the control valve 28. Further, the electrical control device 48, again based upon the temperature of the cooling fluid which is flowing out from the block cooling jacket 5 through the outlet 9 as detected by the block cooling fluid temperature sensor 49b, controls the operation of the cooling fan motor 121 in the following way: if the temperature of the cooling fluid which is flowing out from the block cooling jacket 5 through the outlet 9 as detected by said sensor 49b is less than a so called block cooling fluid fan trigger temperature, which may be equal to the engine warmup completion temperature of exemplarily 80° C. or may be slightly higher than that, for example 90° C., then said electrical control device 48 never closes the relay switch 125. On the other hand, if said temperature of the cooling fluid flowing out from the block cooling jacket 5 as detected by said sensor 49b is greater than said block cooling fluid fan trigger temperature, then, if the temperature of the cooling fluid which is flowing out from the head cooling jacket 4 through the outlet 7 as detected by the head cooling fluid temperature sensor 49a is less than a so called head cooling fluid fan trigger temperature, which is substantially lower than the engine warmup completion temperature of exemplarily 80° C. and may be for example 50° C., than said electrical control device 48 keeps the relay switch 125 open; while, if the temperature of the cooling fluid flowing out from the head cooling jacket 4 as detected by the head cooling fluid temperature sensor 49a is greater than said head cooling fluid fan trigger temperature, then said electrical control device 48 closes the relay switch 125.

This completes the description of the structure of the first preferred embodiment of the internal combustion engine cooling system of the present invention; the manner in which this first preferred embodiment of the apparatus aspect of the present invention functions, which is the first preferred embodiment of the internal combustion engine cooling method of the present invention, will now be described, with particular reference to FIGS. 2, 3 and 4. In each of these figures, those of the control valves 13, 19, 22, 25, and 28 which are in the ON or flow-permitting operational condition are shown as dark, and those control valves which are in the OFF or flow-preventing operational condition are shown as light.

Figure 2:
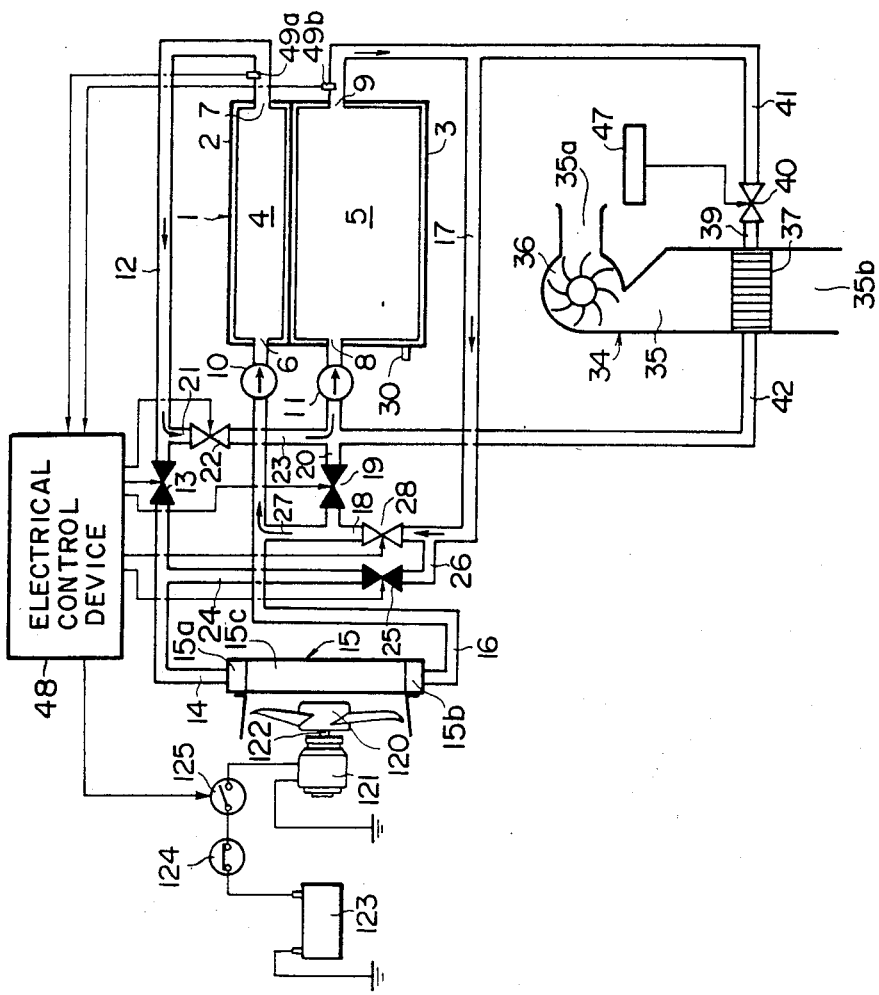
FIG. 2 is another schematic illustration, similar to FIG. 1 and showing open control valves as line diagrams and closed control valves as solid blocks, of said first preferred embodiment of the present invention, showing it as practicing the first preferred embodiment of the cooling method of the present invention, and in its state wherein the engine is not yet warmed up.

FIG. 2 shows the engine operational condition in which the engine is not yet fully warmed up, i.e. in which the temperature of the cooling fluid which is flowing out from the block cooling jacket 5 as detected by the blocking cooling fluid temperature sensor 49b is less than the engine warmup completion temperature, exemplarily 80° C. In this condition, as defined above, the electrical control device 48 fully closes the control valves 13, 19, and 25, and fully opens the control valves 22 and 28, as indicated by the dark and light shadings therefor in FIG. 2. (It is assumed in this figure and in the following ones that the heater control valve 40 is controlled by the control device 47 to be in the OFF state; if in fact this heater control valve is so controlled to be in the ON state, the effect of diversion of some of the flow of heated block cooling fluid through the heater core or matrix 37 will be effectively negligible). Further, as also defined above, the electrical control device 48 keeps said relay switch 125 in the OFF state, thus never operating the cooling fan 120, since the temperature of the cooling fluid flowing out from the block cooling jacket 5 as detected by the block cooling fluid temperature sensor 49b, being less than the engine warmup completion temperature, is a fortiori less than the block cooling fluid fan trigger temperature, which is as specified equal to or slightly higher than said engine warmup completion temperature. Thus, the cooling fluid propelled by the head cooling fluid pump 10 and ejected from its outlet, as indicated by the arrows in the figure, flows through, in order, the head jacket inlet 6, the cooling jacket 4 of the cylinder head 2, the head jacket outlet 7 past the head cooling fluid temperature sensor 49a, the conduit 12, the control valve 22, the conduit 23, the downstream portion of the conduit 20, the block cooling fluid pump 11, the block jacket inlet 8, the cooling jacket 5 of the cylinder block 3, the block jacket outlet 9 past the block cooling fluid temperature sensor 49b, the conduit 17, the control valve 28, the conduit 27, and the downstream portion of the conduit 16, to be recirculated to the inlet of said block cooling fluid pump 10. Thus, in this operational condition, the head cooling jacket 4 and the block cooling jacket 5 are connected in series in a circuit with the cooling fluid pumps 10 and 11 also in series in the circuit, and cooling fluid is circulated through the head cooling jacket 4 to the block cooling jacket 5 and back again to the head cooling jacket 4 without ever passing through the radiator 15; and the cooling fan 120 is definitely never operated.

This means that during this engine warmup operational condition the heat given to the cylinder head 2 by the combustion of fuel in the combustion chambers of the engine 1 is quickly and directly transferred to the cylinder block 3, thus accelerating the warming up process of the cylinder block 3, as opposed to the type of completely separated head and block cooling system in which the cooling circuits for the cylinder head and the cylinder block are completely separated. Thereby, the time taken for engine warming up is reduced, and the temperature rise of the lubricant in the engine 1, which is strongly influenced by the speed of warming up of the cylinder block 3, is accelerated. Thereby, wear on the mechanical parts of the engine 1, as well as production of exhaust emissions, are reduced.

During this engine warming up process, even though the temperature of the cooling fluid flowing out from the head cooling jacket 5 through the head outlet 7 detected by the head cooling fluid temperature sensor 49a may become higher than the aforesaid head cooling fluid fan trigger temperature, which is exemplarily 50° C., nevertheless, since as yet the temperature of the cooling fluid flowing out from the block cooling jacket 5 as detected by the head cooling fluid temperature sensor 49a is still less than the engine warmup completion temperature, exemplarily 80° C., therefore the cooling fan 120 is definitely never operated. Such operation at this time would of course be quite useless, since no cooling fluid is flowing through the radiator 15; and accordingly this non operation of the fan 120 is appropriate.

Next, we consider the case of the engine operational condition in which the engine has been already fully warmed up, i.e. in which the temperature of the cooling fluid which is flowing out from the block cooling jacket 5 as detected by the block cooling fluid temperature sensor 49b has become greater than the engine warmup completion temperature, exemplarily 80° C. In this warmed up condition, therefore, as explained above, in this first preferred embodiment the ON/OFF control of the cooling fan 120 is performed by the control device 48 according as to whether or not the temperature of the cooling fluid which is flowing out from the head cooling jacket 4 through the head outlet 7 detected by the head cooling fluid temperature sensor 49a is above or is below the head cooling fluid fan trigger temperature, exemplarily 50° C.

First, consider the case in which the temperature of the cooling fluid which is flowing out from the block cooling jacket 5 as detected by the block cooling fluid temperature sensor 49b is less than the above defined engine overheating temperature, exemplarily 95° C. In this condition, as defined above and as shown in FIG. 3, said electrical control device 48 fully opens the control valves 13, 19, and 28, and fully closes the control valves 22 and 25, as indicated by the dark and light shadings therefor in FIG. 3. Thus, the cooling fluid propelled by the head cooling fluid pump 10 and ejected from its outlet, as indicated by the arrows in the figure, flows through, in order, the head jacket inlet 6, the cooling jacket 4 of the cylinder head 2, the head jacket outlet 7 past the head cooling fluid temperature sensor 49a, the conduit 12, the control valve 13, the radiator 15, the conduit 16, to be recirculated to the inlet of said block cooling fluid pump 10. On the other hand, the cooling fluid propelled by the block cooling fluid pump 11 and ejected from its outlet, also as indicated by the arrows in the figure, flows through, in order, the block jacket inlet 8, the cooling jacket 5 of the cylinder block 3, the block jacket outlet 9 past the block cooling fluid temperature sensor 49b, the conduit 17, the control valve 28, the conduit 18, the control valve 19, and the conduit 20, to be recirculated to the inlet of said block cooling fluid pump 11. Thus, in this operational condition, the head cooling jacket 4 and the block cooling jacket 5 are included in two independent cooling fluid circuits through which cooling fluid is respectively propelled by the head pump 10 and the block pump 11, with the cooling fluid circuit including the cylinder head cooling jacket 4 also including the radiator 15 in series, while on the other hand the cooling fluid circuit including the cylinder block cooling jacket 5 does not include the radiator 15, and cooling fluid is circulated through the block cooling jacket 5 and the pump 11 and round again without ever being cooled by being passed through said radiator 15; and further at this time no substantial flow takes place through the conduit 27 to mix the cooling fluid flowing in these two independent cooling fluid circuits, since these two circuits are connected together at only one place—the conduit 27.

This means that during this warmed up engine operational condition the heat given to the cylinder head 2 by the combustion of fuel in the combustion chambers of the engine 1 is quickly and directly dissipated by transfer to the radiator 15, and accordingly the cylinder head 2 is strongly cooled; while, on the other hand, at this time, the heat given to the cylinder block 3 is not dissipated by any cooling effect of the radiator 15. Thereby, the cylinder head 2 is kept very good, which increases the mechanical octane value of the engine 1, i.e. helps to prevent knocking and pinking thereof. On the other hand, the cylinder block 3 is allowed to become quite hot, which keeps the temperature of the lubricating oil in the engine 1 high, thus increasing the effectiveness of lubrication of the engine 1, decreasing the wear on the mechanical parts thereof, and decreasing the frictional losses in said engine 1. Further, by this cooling system and method, the output performance of the engine 1, and its fuel economy, are advantageously improved; and also the quality of the exhaust emissions of the engine is improved.

During this engine warmed up operation, when the temperature of the cooling fluid flowing out from the head cooling jacket 5 through the head outlet 7 detected by the head cooling fluid temperature sensor 49a becomes higher than the aforesaid head cooling fluid fan trigger temperature, exemplarily 50° C., then the cooling fan 120 is activated by the control devices 48 closing the relay switch 125, and accordingly the efficiency of cooling provided by the radiator 15 is sharply and substantially increased, thereby cooling down the cylinder head 2 and the cooling fluid flowing therethrough; but when, on the other hand, the temperature of the cooling fluid flowing out from the head cooling jacket 5 through the head outlet 7 detected by the head cooling fluid temperature sensor 49a becomes lower than the aforesaid head cooling fluid fan trigger temperature, then the cooling fan 120 is deactivated by the control device 48 opening the relay switch 125, and accordingly the efficiency of cooling provided by the radiator 15 is sharply and substantially decreased, thereby allowing the cylinder head 2 and the cooling fluid flowing therethrough to warm up again. Thus, by a feedback process, it is expected that during such operation of the engine 1 the temperature of the cooling fluid flowing out from the head cooling jacket 5 through the head outlet 7 as detected by the head cooling fluid temperature sensor 49a will be maintained substantially equal to said head cooling fluid fan trigger temperature, exemplarily 50° C.

Next, suppose that the temperature of the cooling fluid which is flowing out from the block cooling jacket 5 as detected by the block cooling fluid temperature sensor 49b becomes greater than the above defined engine overheating temperature, exemplarily 95° C.; this may quite easily occur, since the cylinder block 3 is not being substantially cooled at all during the above outlined operational mode of the cooling system, and this condition indicated incipient overheating of the engine 1. Further, suppose that this condition of the temperature of the cooling fluid flowing out from the block cooling jacket 5 being greater than the above defined engine overheating temperature has not persisted for longer than said certain predetermined time period, hereinafter termed the critical overheating time period. In this condition, as defined above, said electrical control device 48 fully opens the control valves 13 and 19 as before, fully closes the control valve 22 as before, but now partially opens the control valves 25 and 28. This particular condition of the opening and closing of the control valves, and the particular cooling fluid flow pattern induced thereby, is not indicated by any figure, but is intermediate between the state shown in FIG. 3 and the state shown in FIG. 4. In this case, the flow pattern explained above, in which a cooling fluid circuit including the head cooling jacket 4 and the head pump 10 and and the radiator 15 is provided, and another cooling fluid circuit including the block cooling jacket 5 and the block pump 11 but not including the radiator 15 is provided, is partly maintained, but also a certain mixing of the cooling fluid flowing through these two circuits starts to occur, by a certain part of the flow of cooling fluid flowing from the block jacket outlet 9 past the block cooling fluid temperature sensor 49b and along the conduit 17 being diverted down the conduit 26, through the control valve 25, and through the conduit 24, to pass into the conduit 14 and to be mixed with the flow of cooling fluid which is passing out of the head cooling jacket outlet 7, past the head cooling fluid temperature sensor 49a, and down the conduit 12 and past the control valve 13 to enter said conduit 14. Corresponding to this mixing flow of cooling fluid from the block cooling jacket cooling fluid circuit, which passes from the conduit 14 through the radiator 15, a corresponding reverse flow of cooling fluid is diverted from the conduit 16 and passes down the conduit 27 to mix with the flow of cooling fluid which is passing through the control valve 28, and to then pass through the control valve 19 and the conduit 20 to be recirculated to the inlet of said block cooling fluid pump 11. Thus, in this operational condition, the head cooling jacket 4 and the block cooling jacket 5 are included in two partly independent cooling fluid circuits through which cooling fluid is respectively propelled by the head pump 10 and the block pump 11, with the first cooling fluid circuit including the cylinder head cooling jacket 4 also including the radiator 15 in series, while on the other hand the second cooling fluid circuit including the cylinder block cooling jacket 5 does not include the radiator 15, but a certain mixing of the cooling fluid in this second cooling fluid circuit with the cooling fluid in the first cooling fluid circuit is occurring. Hence, a part of the cooling fluid which is being circulated through the block cooling jacket 5 and the pump 11 and round again is being cooled by being passed through said radiator 15.

This means that, during this incipient overheating engine operational condition (i.e., when the starting of overheating has been detected, but the overheating condition has not continued for longer than said critical overheating time period), the heat given to the cylinder block 3 is now partially being dissipated by the cooling effect of the radiator 15. Thereby, hopefully, the cylinder block 3 starts to be cooled down gradually; and it is to be hoped that this modest attempt towards cooling down of the cylinder block 3 will be adequate to curb the rise in temperature of the cooling fluid which is flowing out from the block cooling jacket 5 as detected by the block cooling fluid temperature sensor 49b, and will cause said temperature to become less than said engine overheating temperature, exemplarily 95° C., within said predetermined critical overheating time period; if so, then the cooling system will revert to the previously defined operational condition of non-overheated operation. During this engine incipient overheating operational condition, it is to be expected that the temperature of the cooling fluid flowing out from the head cooling jacket 5 through the head outlet 7 detected by the head cooling fluid temperature sensor 49a will naturally be higher than the aforesaid head cooling fluid fan trigger temperature, and accordingly naturally the cooling fan 120 will be being activated by the control device 48 closing the relay switch 125, and accordingly the efficiency and cooling provided by the radiator 15 will be at its high level, thereby cooling down the cylinder head 2 and the cooling fluid flowing through the head cooling jacket 4 as quickly as possible, as well as cooling down the cylinder block 3 and the cooling fluid flowing through the block cooling jacket 5. However, if on the contrary the temperature of the cooling fluid flowing out from the head cooling jacket 5 through the head outlet 7 detected by the head cooling fluid temperature sensor 49a is lower than the head cooling fluid fan trigger temperature, then the cooling fan 120 will not be being activated by the control device 48, which is keeping open the relay switch 125, but this will not cause any particular problem, since a good cooling effect is being provided for the blocking cooling fluid flow in any case, due to the cool temperature of the head cooling fluid flow with which said block cooling fluid flow is being mixed.

On the other hand, consider the case that this condition of the temperature of the cooling fluid flowing out from the block cooling jacket 5 being greater than the above defined engine overheating temperature has in fact persisted for longer than said certain predetermined critical overheating time period; i.e. suppose that the above described modest attemp towards cooling down of the cylinder block 3 has not been adequate to curb the rise in temperature of the cooling fluid which is flowing out from the block cooling jacket 5 as detected by the block cooling fluid temperature sensor 49b. In this condition, as also defined above, said electrical control device 48 fully opens the control valves 13 and 19 as before, fully closes the control valve 22 as before, but now fully opens the control valve 25, while also now fully closing the control valve 28. For this so called emergency cooling operational condition, the condition of the opening and closing of the control valves, and the particular cooling fluid flow pattern induced thereby, are shown in FIG. 4. In this case, as shown by the arrows in the figure, the flow of cooling fluid flowing from the head jacket outlet 7 past the head cooling fluid temperature sensor 49a and along the conduit 12 passes down the conduit 14 and through the radiator 15 and back along the conduit 16 as before, to be recirculated to the inlet of the block cooling fluid pump 10. On the other hand, the flow of cooling fluid flowing from the block jacket outlet 9 past the block cooling fluid temperature sensor 49b and along the conduit 17 now entirely is passed into the conduit 26, through the control valve 25, and through the conduit 24, to pass into the conduit 14 and to be mixed with the abovementioned head flow of cooling fluid, to pass through through the radiator 15. A corresponding reverse flow of cooling fluid also occurs from the conduit 16 into the conduit 27, and then passes into the lower part of the conduit 18, through the control valve 19 and down the conduit 20, to be recirculated to the inlet of the block cooling fluid pump 11. Thus, in this operational condition, the cooling circuits for the head cooling jacket 4 and the block cooling jacket 5 are completely linked. Hence, all the cooling fluid which is being circulated through the block cooling jacket 5 and the pump 11 and round again is cooled by being passed through said radiator 15.

This means that, during the emergency cooling engine operational condition (i.e., when the overheating condition has continued for longer than said critical overheating time period), the heat given to the cylinder block 3 is now as much as possible being dissipated by the cooling effect of the radiator 15. Thereby, definitely, the cylinder block 3 is cooled down quickly and forcibly; and it is practically certain that this cooling effect will be adequate to curb the rise in temperature of the cooling fluid which is flowing out from the block cooling jacket 5 as detected by the block cooling fluid temperature sensor 49b, and will cause said temperature to become less than said engine overheating temperature, exemplarily 95° C., within a reasonable time period. During this emergency cooling engine operational condition, of course as before typically the temperature of the cooling fluid flowing out from the head cooling jacket 5 through the head outlet 7 detected by the head cooling fluid temperature sensor 49a will be higher than the aforesaid head cooling fluid fan trigger temperature, and accordingly typically the cooling fan 120 will be being activated by the control device 48 closing the relay switch 125, and accordingly the efficiency of cooling provided by the radiator 15 will typically be at its high level, thereby cooling down the cylinder head 2 and the cooling fluid flowing through the head cooling jacket 4 and also the cylinder block 3 and the cooling fluid flowing through the block cooling jacket 5 as quickly as possible; but, as explained before, if in fact that is not the case, no deleterious effects will ensue.

Figure 4:
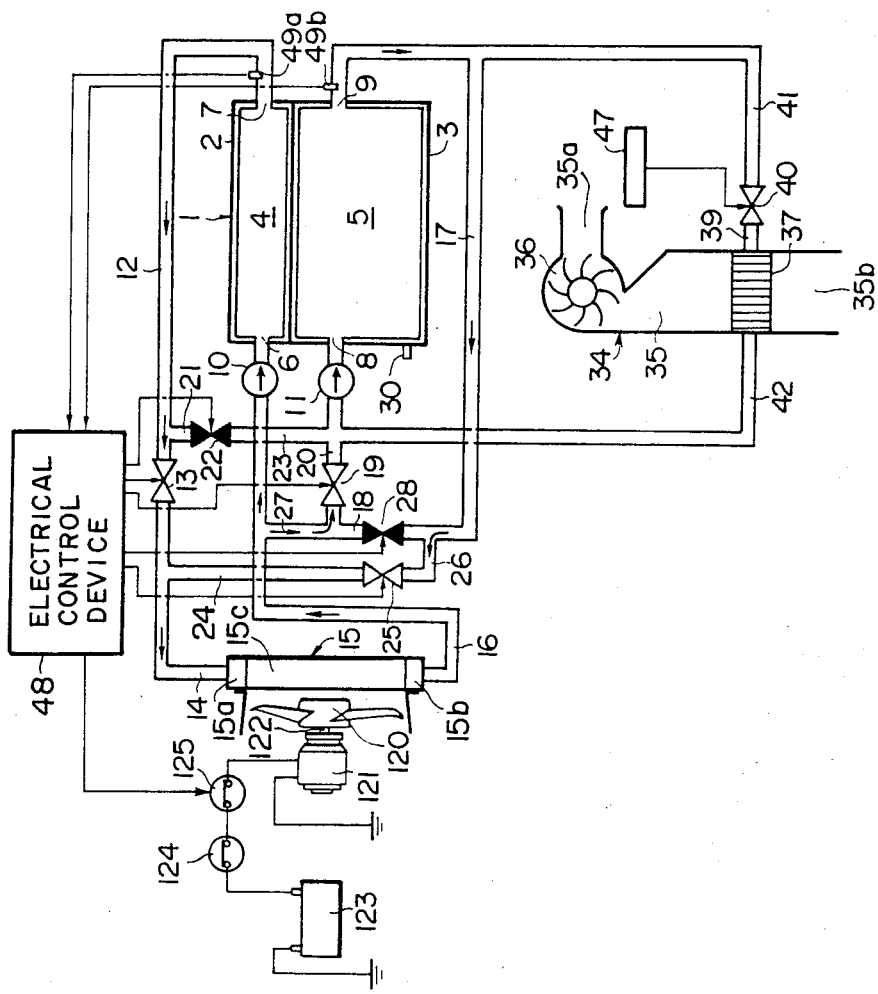
FIG. 4 is yet another schematic illustration, similar to FIGS. 1 through 3, of said first preferred system embodiment practicing said first method embodiment, and showing it in its state wherein the engine has been overheating for a time period longer than a predetermined critical time period.
Figure 5:
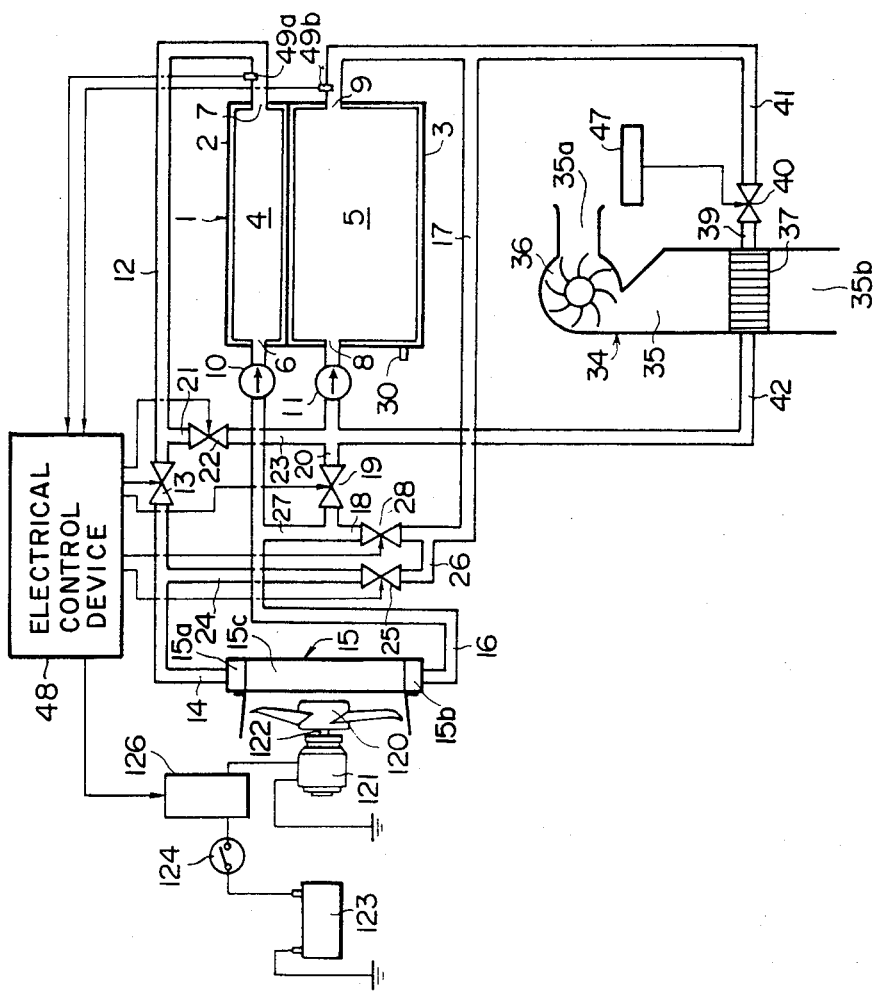
FIG. 5 is a schematic illustration, similar to FIG. 1 relating to the first preferred embodiment, of a second preferred embodiment of the cooling system of the present invention for practicing a second preferred embodiment of the cooling method of the present invention, in which the speed of said cooling fan is variable through a range.

In FIG. 5, there is shown, in a similar fashion to FIG. 1, a second preferred embodiment of the internal combustion engine cooling system of the present invention for practicing a second preferred embodiment of the cooling method of the present invention. In this figure, parts of this second apparatus embodiment which correspond to parts of the first preferred apparatus embodiment shown in FIGS. 1 through 4 are designated by the same reference symbols.

In this second preferred apparatus embodiment, the only constructional difference from the first apparatus embodiment is that, for controlling the supply of electrical energy to the motor 121 for driving the cooling fan 120, instead of the relay switch 125 of the first preferred embodiment, there is provided an electric current control device 126 which can take on any of three operational states, according to control thereof by supply of an actuating electrical signal by the electrical control device 48. In its first operational state, the current control device 126 totally prohibits any current from passing through it; in its second operational state, the current control device 126 allows a certain first lower current to pass through it to be supplied to the electric motor 121; and, in its third operational state, the current control device 126 allows a certain second higher current to pass through it to be supplied to the electric motor 121. Further, in this second preferred apparatus embodiment of the present invention, the characteristics of the electrical control device 48, while being the same as regards the manner in which it supplies actuating electrical control signals to the five control valves 13, 19, 22, 25, and 28 according to the signals from the temperature sensors 49a and 49b, are different with regard to the manner in which it supplies actuating electrical control signals to the current control device 126. In detail, said electrical control device 48, based upon the temperature of the cooling fluid which is flowing out from the block cooling jacket 5 as detected by the block cooling fluid temperature sensor 49b, controls the operation of the current control device 126, so as to control the operation of the cooling fan motor 121, in the following way: if the temperature of the cooling fluid which is flowing out from the block cooling jacket 5 as detected by the temperature sensor 49b is less than a so called block cooling fluid fan trigger temperature, which as before may be equal to the engine warmup completion temperature of exemplarily 80° C. or may be slightly higher than that, for example 90° C., then said electrical control device 48 causes the current control device 136 to totally prohibit any current from passing through it, so that the cooling fan 120 is not operated at all. On the other hand, if said temperature of the cooling fluid flowing out from the block cooling jacket 5 as detected by said sensor 49b is greater than said block cooling fluid fan trigger temperature but is less than the aforesaid engine overheating temperature, again exemplarily 95° C., then, if the temperature of the cooling fluid which is flowing out from the head cooling jacket 4 as detected by the head cooling fluid temperature sensor 49a is less than a so called head cooling fluid fan trigger temperature, which again is substantially lower than the engine warmup completion temperature of exemplarily 80° C. and may be for example 50° C., then said electrical control device 48 again causes the current control device 126 to totally prohibit any current from passing through it, so that the cooling fan 120 is not operated at all; while, if the temperature of the cooling fluid flowing out from the head cooling jacket 4 as detected by the head cooling fluid temperature sensor 49a is greater than said head cooling fluid fan trigger temperature, then said electrical control device 48 causes the current control device 126 to allow said certain first lower current to pass through it to be supplied to the electric motor 121, so that the cooling fan 120 is operated at a certain first lower speed. On the other hand, if said temperature of the cooling fluid flowing out from the block cooling jacket 5 as detected by said sensor 49b is greater than said engine overheating temperature, then, if said temperature of the cooling fluid flowing out from the head cooling jacket 4 as detected by said sensor 49a is greater than said head cooling fluid fan trigger temperature, said electrical control device 48 causes the current control device 126 to allow said certain second higher current to pass through it to be supplied to the electric motor 121, so that the cooling fan 120 is operated at a certain second higher speed; while, on the other hand, if said temperature of the cooling fluid flowing out from the head cooling jacket 4 as detected by said sensor 49a is less than said head cooling fluid fan trigger temperature, said electrical control device 48 causes the current control device 126 to totally prohibit any current from passing through it, so that the cooling fan 120 is not operated at all.

Figure 3:
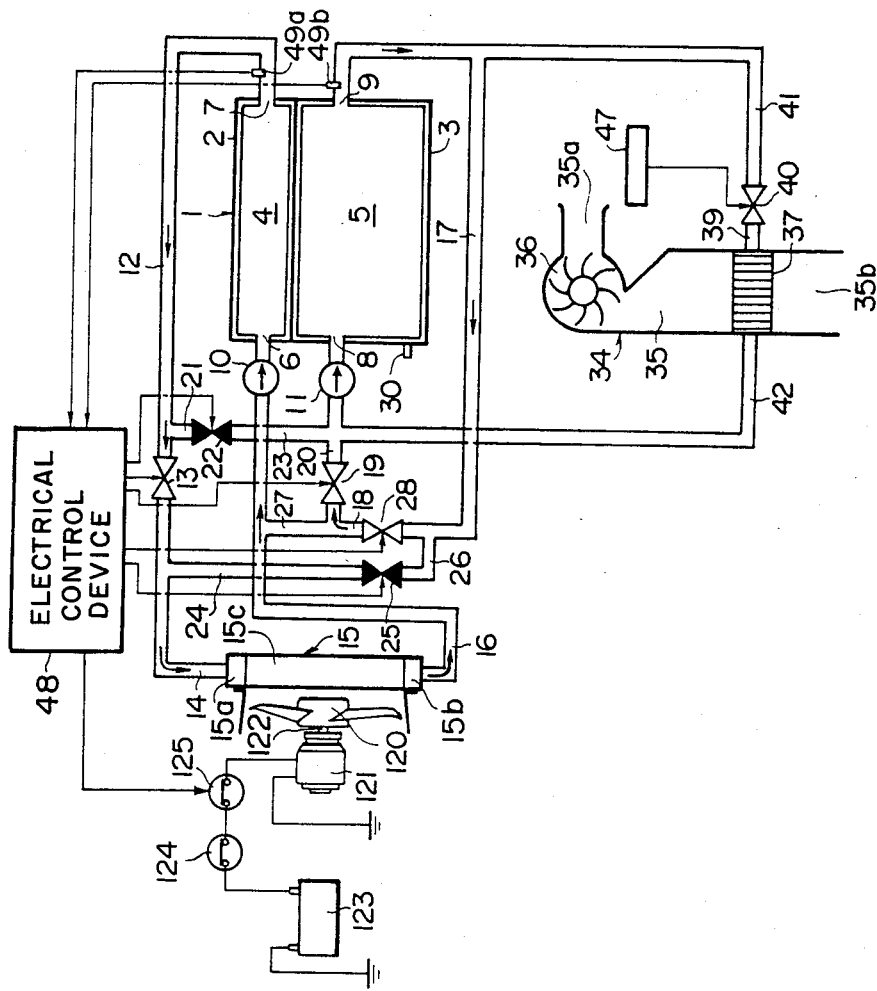
FIG. 3 is another schematic illustration, similar to FIGS. 1 and 2, of said first preferred system embodiment practicing said first method embodiment, and showing it in its state wherein the engine is fully warmed up and is not overheating.

This completes the description of the structure of the second preferred embodiment of the internal combustion engine cooling system of the present invention; the manner in which this second preferred apparatus embodiment functions, which is the second preferred embodiment of the internal combustion engine cooling method of the present invention, is similar to that of the first preferred method embodiment, except that the cooling fan 120 is rotated at said first lower speed, so as to provide a less powerful cooling effect for the radiator 15, during the cooling fan operation phase during normal engine operation in which the various control valves are so controlled as to provide two separate cooling fluid circuits for the cylinder head 2 and the cylinder block 3, as schematically shown in FIG. 3 with respect to the first preferred method embodiment; and is positively and definitely rotated at said second higher speed, so as to provide a more powerful cooling effect for the radiator 15, (provided that the temperature of the cooling fluid flowing out of the head cooling jacket 4 is above said head cooling fluid fan trigger temperature) during the so called engine overheating operation in which the various control valves are so controlled as to provide two connected or mixed cooling circuits for the cylinder head 2 and the cylinder block 3, as schematically shown in FIG. 4 with respect to the first preferred method embodiment. This is helpful with regard to improving the heat dissipation efficiency of the radiator 15 during this overheating condition of the engine 1, which causes more forcible cooling of the cooling fluid flowing therethrough and more effectively curbs the engine overheating situation. The further details of the operation of this second preferred apparatus embodiment, according to this second preferred method embodiment, will be clear to one of ordinary skill in the art, based upon the explanations above, and by analogy with the first preferred embodiment.

Figure 6:
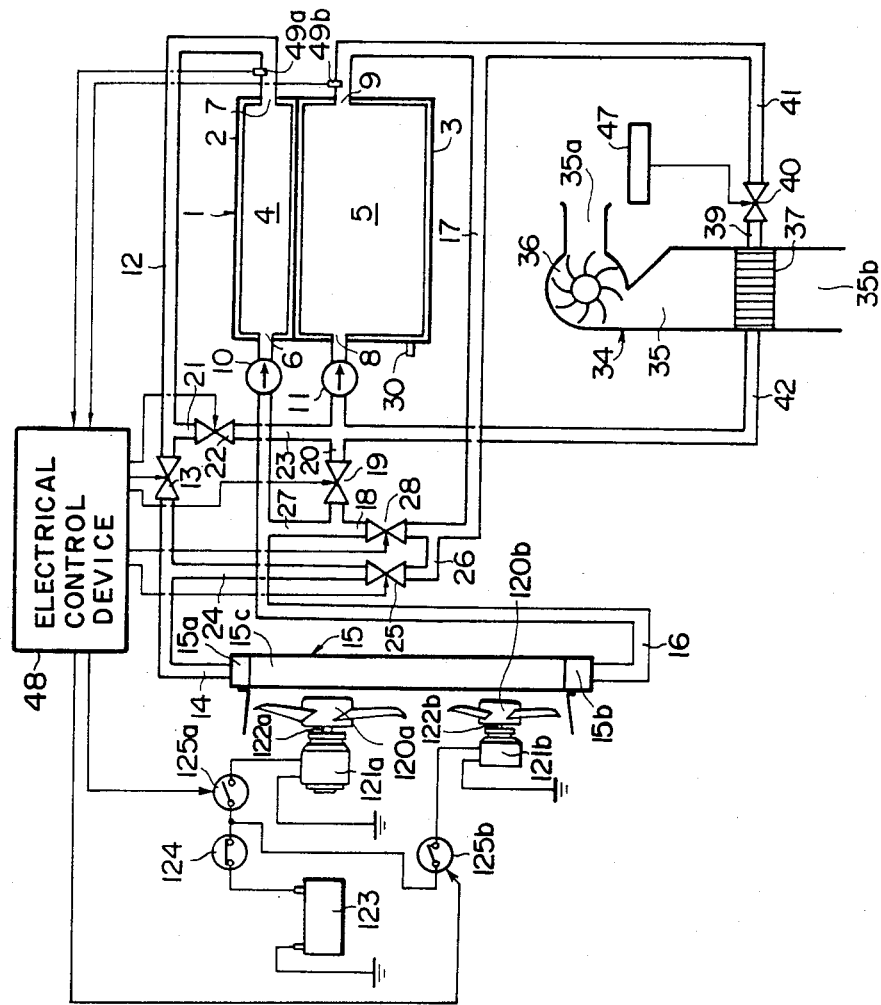
FIG. 6 is a schematic illustration, similar to FIGS. 1 and 5 relating respectively to the first and the second preferred embodiments, of a third preferred embodiment of the cooling system of the present invention for practicing a third preferred embodiment of the cooling method of the present invention, in which two separate cooling fans are provided.

In FIG. 6, there is shown, in a similar fashion to FIGS. 1 and 5, a third preferred embodiment of the internal combustion engine cooling system of the present invention for practicing a third preferred embodiment of the cooling method of the present invention. In this figure, parts of this third apparatus embodiment which correspond to parts of the first and second preferred apparatus embodiments shown in FIGS. 1 through 5 are designated but the same reference symbols.

In this third preferred apparatus embodiment, the only constructional difference from the first apparatus embodiment is that two cooling fans 120a and 120b are provided, respectively mounted on power output shafts 122a and 122b of electric motors 121a and 121b. Correspondingly, two relay switches 125a and 125b are provided, each controlling the supply of electrical energy to the appropriate one of said electric motors 121a and 121b, and both controlled by electrical signals dispatched thereto by the control device 48. In fact, in this embodiment, the cooling fan 121a is the larger and is the primary cooling fan, while the cooling fan 121b is the smaller and is the secondary cooling fan. Further, in this third preferred apparatus embodiment of the present invention, the characteristics of the electrical control device 48, while being the same as in the first and second embodiments as regards the manner in which it supplies actuating electrical control signals to the five control valves 13, 19, 22, 25, and 28 according to the signals from the temperature sensors 49a and 49b, are naturally different with regard to the manner in which it supplies actuating electrical control signals to the relay switch 125a and the relay switch 125b. In detail, said electrical control device 48, based upon the temperature of the cooling fluid which is flowing out from the block cooling jacket 5 as detected by the block cooling fluid temperature sensor 49b, controls the operation of the relay switch 125a and the relay switch 125b, so as to control the operation of the cooling fan motors 121a and 121b, in the following way: if the temperature of the cooling fluid which is flowing out from the block cooling jacket 5 as detected by the temperature sensor 49b is less than a so called block cooling fluid fan trigger temperature, which as before may be equal to the engine warmup completion temperature of exemplarily 80° C. or may be slightly higher than that, for example 90° C., then said electrical control device 48 causes the relay switch 125a and the relay switch 125b to be in the OFF condition, so as to totally prohibit any current from passing through them, so that the cooling fans 120a and 120b are not operated at all. On the other hand, if said temperature of the cooling fluid flowing out from the block cooling jacket 5 as detected by said sensor 49b is greater than said block cooling fluid fan trigger temperature but is less than the aforesaid engine overheating temperature, again exemplarily 95° C., then, if the temperature of the cooling fluid which is flowing out from the head cooling jacket 4 as detected by the head cooling fluid temperature sensor 49a is less than a so called head cooling fluid fan trigger temperature, which again is substantially lower than the engine warmup completion temperature of exemplarily 80° C. and may be for example 50° C., then said electrical control device 48 again causes the relay switch 125a and the relay switch 125b both to be in the OFF state, so as to totally prohibit any current from passing through them, so that the cooling fans 120a and 120b are not operated at all; while, if the temperature of the cooling fluid flowing out from the head cooling jacket 4 as detected by the head cooling fluid temperature sensor 49a is greater than said head cooling fluid fan trigger temperature, then said electrical control device 48 causes the relay switch 125a, only, to be in the ON state, so as to pass electrical current to be supplied to the primary electric motor 121a, only, so that the primary cooling fan 120a, only, is operated. On the other hand, if said temperature of the cooling fluid flowing out from the block cooling jacket 5 as detected by said sensor 49b is greater than said engine overheating temperature, then, provided that also said temperature of the cooling fluid flowing out from the head cooling jacket 4 as detected by said sensor 49a is greater than said head cooling fluid fan trigger temperature, said electrical control device 48 causes both the relay switch 125a and the relay switch 125b to be in the ON condition, so that both of the cooling fans 120a and 120b are operated; whereas, on the other hand, if said temperature of the cooling fluid flowing out from the head cooling jacket 4 as detected by said sensor 49a is less than said head cooling fluid fan trigger temperature, said electrical control device 48 causes both the relay switch 125a and the relay switch 125a to be in the OFF condition, so that neither of the cooling fans 120a and 120b is operated.

This completes the description of the structure of the third preferred embodiment of the internal combustion engine cooling system of the present invention; the manner in which this third preferred apparatus embodiment functions, which is the third preferred embodiment of the internal combustion engine cooling method of the present invention, is similar to that of the first preferred method embodiment, except that only the primary cooling fan 120a is rotated, so as to provide a less powerful cooling effect for the radiator 15, during the cooling fan operation phase during normal engine operation in which the various control valves are so controlled as to provide two separate cooling fluid circuits for the cylinder head 2 and the cylinder block 3, as schematically shown in FIG. 3 with respect to the first preferred method embodiment; and both the primary cooling fan 120a and the secondary cooling fan 120b are positively and definitely rotated, so as to provide a more powerful cooling effect for the radiator 15, during the so called engine overheating operation in which the various control valves are so controlled as to provide two connected or mixed cooling circuits for the cylinder head 2 and the cylinder block 3, as schematically shown in FIG. 4 with respect to the first preferred method embodiment. As in the case of the second embodiment, this is helpful with regard to improving the heat dissipation efficiency of the radiator 15 during this overheating condition of the engine 1, which causes more forcibly cooling of the cooling fluid flowing therethrough and more effectively curbs the engine overheating situation. The further details of the operation of this third preferred apparatus embodiment, according to this third preferred method embodiment, will be clear to one of ordinary skill in the art, based upon the explanations above, and by analogy with the first and second preferred embodiments.

Figure 7:
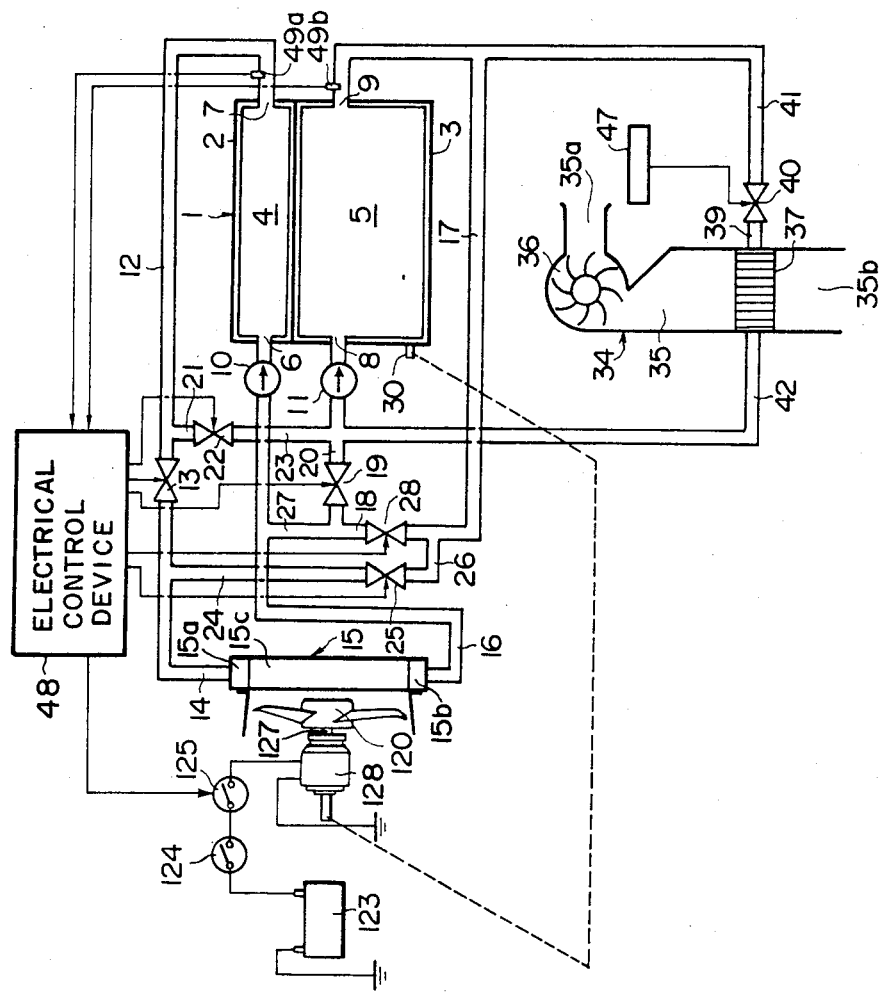
FIG. 7 is a schematic illustration, similar to FIGS. 1, 5, and 6 relating respectively to the first through the third preferred embodiments, of a fourth preferred embodiment of the cooling system of the present invention for practicing a fourth preferred embodiment of the cooling method of the present invention, in which the cooling fan is driven from the crankshaft of the engine.

In FIG. 7, there is shown, in a similar fashion to FIGS. 1, 5 and 6, a fourth preferred embodiment of the internal combustion engine cooling system of the present invention. In this figure, parts of this fourth preferred apparatus embodiment which correspond to parts of the first through third preferred apparatus embodiments shown in FIGS. 1 through 6 are designated by the same reference symbols.

In this fourth preferred apparatus embodiment, the only constructional difference from the first apparatus embodiment is that, instead of the cooling fan 120 being driven by an electric motor, it is coupled to the power output shaft 127 of an electromagnetic clutch 128, which may be of a per se well known type, and the power input member of which is coupled to the crankshaft 30 of the engine 1 as schematically indicated by the dashed line. The relay switch 125, in this fourth embodiment, when controlled to be in the ON condition by the electrical control device 48, energizes the electromagnetic clutch 128 so as to transmit the rotation of the crankshaft 30 to the shaft 127 and the fan 120. The constitution of the electrical control device 48, in this fourth preferred apparatus embodiment, in fact is quite the same as in the first preferred apparatus embodiment. Thus, the details of the operation of this fourth preferred apparatus embodiment, according to this fourth preferred method embodiment, will be clear to one of ordinary skill in the art, based upon the explanations above, and by analogy with the first preferred embodiment.

Figure 8:
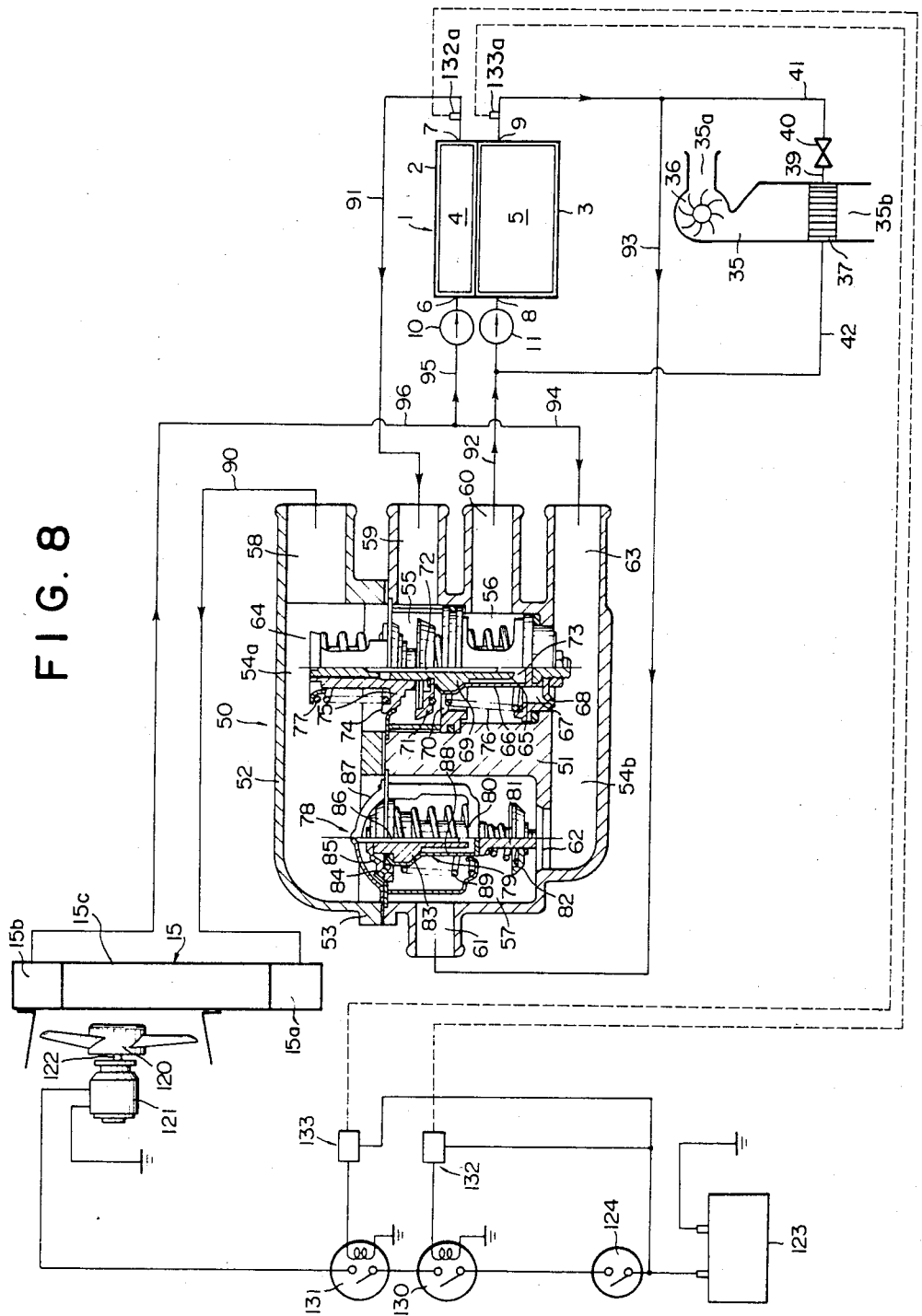
FIG. 8 is a schematic illustration, somewhat similar to FIGS. 1, 5, 6, and 7 relating respectively to the first through the fourth preferred embodiments but rather differing therefrom, of a fifth preferred embodiment of the cooling system of the present invention for practicing a fifth preferred embodiment of the cooling method of the present invention, in which the valves for controlling flow of cooling fluid are provided together as a compound valve and are operated directly by thermosensitive actuators without any electrical control being provided therefor, showing said compound valve in cross section.

In FIG. 8, there is shown, in a rather similar fashion to FIGS. 1, 5, 6, and 7, a fifth preferred embodiment of the internal combustion engine cooling system of the present invention for practicing a fifth preferred embodiment of the cooling method of the present invention. In this figure, parts of the fifth apparatus embodiment which correspond to parts of the first through fourth preferred apparatus embodiments shown in FIGS. 1 through 7 are designated by the same reference symbols.

In this fifth preferred apparatus embodiment, the constructional differences from the first apparatus embodiment are fairly major, because this is an embodiment in which no microcomputer is required for controlling the cooling system. Accordingly, there is not provided any single control means analogous to the electrical control device 48 of the first through the fourth preferred embodiments. In this fifth apparatus embodiment, the valves for controlling flow of cooling fluid are provided together as a compound temperature sensitive control valve assembly 50, and as will be seen hereinafter are operated directly by thermosensitive actuators without any electrical control being provided therefor. This compound valve assembly 50 is shown in FIG. 8 in cross sectional view; the other elements of the cooling system, and of the engine 1 and so on, are shown schematically.

The housing of the control valve assembly 50 is made up of a main body 51 and a cover 52 which fits against said main body 51. Within this combination there are defined five valve chambers 54a, 54b, 55, 56, and 57. A port 58 leads from the valve chamber 54a to the exterior, a valve port 84 communicates between said valve chamber 54a and the valve chamber 57; and another valve port 74 communicates between said valve chamber 54a and the valve chamber 55. A port 63 leads from the valve chamber 54b to the exterior, a valve port 62 communicates between said valve chamber 54b and the valve chamber 57; and another valve port 67 communicates between said valve chamber 54b and the valve chamber 56. A port 61 leads from the valve chamber 57 to the exterior, a port 59 leads from the valve chamber 55 to the exterior, another port 60 leads from the valve chamber 56 to the exterior; and another valve port 70 communicates between the valve chamber 55 and the value chamber 56. And two valve element actuator assemblies 64 and 78 with, in all, five valve elements, are provided for controlling these five valve ports 84, 74, 62, 68, and 70.

In detail, the valve element actuator assembly 64 comprises a thermosensitive actuator 65, which has a tubular case 66 to which is securely fixed a valve element 68, which cooperates with the valve port 67 between the valve chambers 54b and 56 by approaching towards said valve port 67 from the lower side thereof in FIG. 8 or by moving away therefrom, so as selectively respectively to close or to open said valve port 67. Further, a needle guide member 69 is integrally formed in the case 66, and to this needle guide member 69 there is securely fixed a valve element 71, which cooperates with the valve port 70 between the valve chambers 55 and 56 by approaching towards said valve port 70 from the upper side thereof in FIG. 8 or by moving away therefrom, so as selectively respectively to close or to open said valve port 70. The connected body comprising the case 66, the needle guide member 69, and the valve elements 68 and 71 is biased upwards in the figure by a compression coil spring 76, i.e. in the direction to cause the valve element 63 to close the valve port 67 and to cause the valve element 71 to open the valve port 70. In the needle guide member 69 there is slidably fitted a valve needle 72, with a mass 73 of thermally expansible material such as a per se well known type of thermowax received in a chamber defined between the end of said valve needle 72 and the lower close end in the figure of the needle guide member 69. To the upper end in the figure of the valve needle 72 there is fixedly mounted a valve element 75, which cooperates with the valve port 74 between the valve chambers 54a and 55 by approaching towards said valve port 74 from the upper side thereof in FIG. 8 or by moving away therefrom, so as selectively respectively to close or to open said valve port 74. This valve element 75 is biased downwards in the figure by a compression coil spring 77 which also bears against a member fixed to the body of the composite valve assembly 50, i.e. in the direction to cause the valve element 75 to close the valve port 74.

This thermosensitive actuator 65 is sensitive to the temperature of the cooling fluid present within the valve chamber 56, and the pressure within the chamber in the needle guide member 69 generated by the thermal expansion of the thermowax material mass 73 becomes great enough to push the connected body comprising the case 66, the needle guide member 69, and the valve elements 68 and 71 downwards in the figure against the biasing action of the compression coil spring 76, and substantially simultaneously to move the valve element 75 upwards in the figure against the biasing action of the compression coil spring 77, when said temperature of the cooling fluid in said valve chamber 56 becomes greater than an engine warmup completion temperature, exemplarily 80° C., which corresponds to the engine warmup completion temperature of the first four preferred embodiments described above.

Further, the valve element actuator assembly 78 comprises a thermosensitive actuator 79, which has a tubular case 80 to which is securely fixed, via a rod 81, a valve element 82, which cooperates with the valve port 62 between the valve chambers 54b and 57 by approaching towards said valve port 62 from the upper side thereof in FIG. 8 or by moving away therefrom, so as selectively respectively to close or to open said valve port 62. A needle guide member 83 is integrally mounted to the case 80, and to this needle guide member 83 there is securely fixed a valve element 85, which cooperates with the valve port 84 between the valve chambers 54a and 57 by approaching towards said valve port 34 from the lower side thereof in FIG. 8 or by moving away therefrom, so as selectively respectively to close or to open said valve port 84. The connected body comprising the case 80, the needle guide member 83, the rod 81, and the valve elements 82 and 85 is biased upwards in the figure by a compression coil spring 89, i.e. in the direction to cause the valve element 82 to open the valve port 62 and to cause the valve element 85 to close the valve port 84. In the needle guide member 83 there is slidably fitted a valve needle 86, with a mass 88 of thermally expansible material such as a per se well known type of thermowax received in a chamber defined between the end of said valve needle 86 and the lower closed end in the figure of the needle guide member 83. The upper end in the figure of the valve needle 86 is fixedly connected to a valve frame 87 which is mounted to the body of the valve assembly 50. Thus, when the thermowax material mass 88 expands sufficiently, responding to the temperature of the cooling fluid in the valve chamber 57, it pushes the valve needle 86 out of the needle guide member 83, and, against the biasing action of the compression coil spring 89 which is overcome, moves the connected body comprising the case 80, the needle guide member 83, and rod 81, and the valve elements 82 and 85 downwards in the figure, i.e. in the direction to cause the valve element 82 to close the valve port 62 and to cause the valve element 85 to open the valve port 84.

This thermosensitive actuator 79 is sensitive to the temperature of the cooling fluid present within the valve chamber 57, and the pressure within the chamber in the needle guide member 83 generated by the thermal expansion of the thermowax material mass 88 becomes great enough to push the connected body comprising the case 80, the needle guide member 83, the rod 81, and the valve elements 82 and 85 downwards in the figure against the biasing action of the compression coil spring 89, when said temperature of the cooling fluid in said valve chamber 57 becomes greater than an engine overheating temperature, exemplarily 95° C., which corresponds to the engine overheating temperature of the first four preferred embodiments described above. However, according to a particular feature of the shown fifth preferred embodiment, this switching over action of the thermosensitive actuator 79 is arranged not to take place suddenly at said engine overheating temperature, but occurs gradually over a certain temperature range, with said actuator 79 gradually moving the valve elements 82 and 85 downwards in the figure as the temperature of the cooling fluid in the valve chamber 57 rises past said engine overheating temperature.

The external ports of the control valve assembly 50 are connected as follows: the port 58 which opens to the valve chamber 54a is connected, via a conduit 90, to the header or intake tank 15a of the radiator 15; the port 59 which opens to the valve chamber 55 is connected, via a conduit 91, to the cooling fluid outlet 7 of the head cooling jacket 4; the port 60 which opens to the valve chamber 56 is connected, via a conduit 92, to the inlet of the block cooling fluid pump 11; the port 61 which opens to the valve chamber 57 is connected, via a conduit 93, to the cooling fluid outlet 9 of the block cooling jacket 5; and the port 63 which opens to the valve chamber 54b is connected, via the series connection of a conduit 94 and a conduit 95, to the inlet of the head cooling fluid pump 10. Further, the joining point of said conduits 94 and 95 is connected to the outlet tank 15b of the radiator 15 by a conduit 96.

The radiator 15 is selectively provided with a draft of cooling air by a fan 120 which is mounted on the end of a power output shaft 122 of a electric motor 121; these arrangements are similar to those in the first preferred embodiment described above and shown in FIGS. 1 through 4. However, the way in which said electric motor 121 is selectively provided with actuating electrical energy are different in this fifth preferred embodiment. In detail, the electric motor 121 is selectively supplied with actuating electrical energy from a battery 123 of the vehicle via the series combination of the accessories circuit of an ignition switch 124 of the vehicle, an ON/OFF relay switch 130, and an ON/OFF relay switch 131. A head cooling fluid temperature sensor 132a, which provides an electrical output signal indicative of the temperature of the cooling fluid surrounding a sensor element thereof, is mounted in the conduit 91 close to the upstream end thereof, i.e. close to the cooling fluid outlet 7 of the head cooling jacket 4; and a similar block cooling fluid temperature sensor 133a is mounted in the conduit 93 close to the upstream end thereof, i.e. close to the cooling fluid outlet 9 of the block cooling jacket 5.

The output electrical signals of these two temperature sensors 132a and 133a are respectively sent to electrical control devices 132 and 133, which in the present specification will only be described with regard to their function and not with regard to their construction because various possible constructions for them will easily be conceived of by one of ordinary skill in the electronic art, based upon the disclosure herein. The operational characteristics of these electrical control devices 132 and 133, in this fifth preferred embodiment, are as follows. The device 132 receives supply of voltage from the battery 124 at its terminal "x" and transmits said voltage to its terminal "y", to cause the relay switch 130 to be in the ON state, if and only if the electrical signal supplied to its terminal "z" from the head cooling fluid temperature sensor 132a is indicative of a temperature of the cooling fluid flowing out of the outlet 7 of the head cooling jacket 4 equal to or greater than the aforesaid engine warmup completion temperature, exemplarily 80° C., or of a predetermined temperature thereof slightly higher than it, exemplarily 90° C. And the electrical control device 133 receives supply of voltage from the battery 124 at its terminal "x" and transmits said voltage to its terminal "y", to cause the relay switch 130 to be in the ON state, if and only if the electrical signal supplied to its terminal "z" from the block cooling fluid temperature sensor 133a is indicative of a temperature of the cooling fluid flowing out of the outlet 9 of the block cooling jacket 5 equal to or greater than the aforesaid head cooling fluid fan trigger temperature, exemplarily 50° C.

The arrangements relating to the heater comprising the heater core 35b, etc., are the same as in the other preferred embodiments described above, and will not be particularly further discussed herein.

This completes the description of the structure of the fifth preferred embodiment of the internal combustion engine cooling system of the present invention; the manner in which this fifth preferred apparatus embodiment functions, which is the fifth preferred embodiment of the internal combustion engine cooling method of the present invention, will now be described.

FIG. 8 shows the position of the various control valves in the engine operational condition in which the engine is not yet fully warmed up, i.e. in which the temperature of the cooling fluid which is flowing out from the block cooling jacket 5 as detected by the block cooling fluid temperature sensor 133a is less than the engine warmup completion temprature, exemplarily 80° C. In this condition, as defined above and as shown in the figure, the thermosensitive actuators 65 and 79 position the valve elements 68, 71, 75, 82, and 85 with relation to the respective valve ports 67, 70, 74, 62, and 84 so that: the valve port 67 is closed, preventing communication between the valve chamber 54b and the valve chamber 56; the valve port 70 is opened, allowing communication between the valve chamber 55 and the valve chamber 56; the valve port 75 is closed, preventing communication between the valve chamber 54a and the valve chamber 55; the valve port 62 is opened, allowing communication between the valve chamber 54b and the valve chamber 57; and the valve port 84 is closed, preventing communication between the valve chamber 54a and the valve chamber 57. Further, as also defined above, the electrical control device 133 does not provide any voltage at its terminal "y", thus ensuring that the relay switch 131 is in the OFF state and that the the cooling fan 120 is never operated. Thus, the cooling fluid propelled by the head cooling fluid pump 10 and ejected from its outlet, as indicated by the arrows in the figure, flows through, in order, the head jacket inlet 6, the cooling jacket 4 of the cylinder head 2, the head jacket outlet 7 past the head cooling fluid temperature sensor 132a, the conduit 91, the port 59 of the control valve assembly 50, the valve chamber 55, the valve port 70, the chamber 56, the port 60, the conduit 92, the block cooling fluid pump 11, the block jacket inlet 8, the cooling jacket 5 of the cylinder block 3, the block jacket outlet 9 past the block cooling fluid temperature sensor 133a, the conduit 93, the port 61 of the control valve assembly 50, the valve chamber 57, the valve port 62, the valve chamber 54b, the port 63, the conduit 94, and the conduit 95, to be recirculated to the inlet of said block cooling fluid pump 10. Thus, in this operational condition, the head cooling jacket 4 and the block cooling jacket 5 are connected in series in a circuit with the cooling fluid pumps 10 and 11 also in series in this circuit, and cooling fluid is circulated through the head cooling jacket 4 to the block cooling jacket 5 and back again to the head cooling jacket 4 without ever passing through the radiator 15; and the cooling fan 120 is definitely never operated.

As in the case of the first preferred embodiment described above, this means that during this engine warmup operational condition the heat given to the cylinder head 2 by the combustion of fuel in the combustion chambers of the engine 1 is quickly and directly transferred to the cylinder block 3, thus accelerating the warming up process of the cylinder block 3, as opposed to the type of completely separated head and block cooling system in which the cooling circuits for the cylinder head and the cylinder block are completely separated. Thereby, the time taken for engine warming up is reduced, and the temperature rise of the lubricant in the engine 1, which is strongly influenced by the speed of warming up of the cylinder block 3, is accelerated. Thereby, wear on the mechanical parts of the engine 1, as well as production of exhaust emissions, are reduced.

During this engine warming up process, even though the temperature of the cooling fluid flowing out from the head cooling jacket 5 through the head outlet 7 detected by the head cooling fluid temperature sensor 132a may become higher than the aforesaid head cooling fluid fan trigger temperature, which is exemlarily 50° C., nevertheless, since as yet the temperature of the cooling fluid flowing out from the block cooling jacket 5 as detected by the head cooling fluid temperature sensor 132a is still less than the engine warmup completion temperature, exemplarily 80° C., therefore the cooling fan 120 is definitely never operated, since the relay switches 130 and 131 are in series. Such operation at this time would of course be quite useless, since no cooling fluid is flowing through the radiator 15; and accordingly this non operation of the fan 120 is appropriate.

Next, we consider the case of the engine operational condition in which the engine has been already fully warmed up, i.e. in which the temperature of the cooling fluid which is flowing out from the block cooling jacket 5 as detected by the block cooling fluid temperature sensor 133a has become greater than the engine warmup completion temperature, exemplarily 80° C. In this warmed up condition, therefore, as explained above, in this fifth preferred embodiment the electrical control device 133 is definitely transmitting voltage to its terminal "y", so as to cause the relay switch 131 to be in the ON state. Thus, the ON/OFF control of the cooling fan 120 is performed only by the electrical control device 132, according as to whether or not the temperature of the cooling fluid which is flowing out from the head cooling jacket 4 through the head outlet 7 detected by the head cooling fluid temperature sensor 132a is above or is below the head cooling fluid fan trigger temperature, exemplarily 50° C., since the relay switches 130 and 131 are in series.

First, consider the case in which the temperature of the cooling fluid which is flowing out from the block cooling jacket 5 as detected by the block cooling fluid temperature sensor 133a is less than the above defined engine overheating temperature, exemplarily 95° C. On transition to this condition from the engine not fully warmed up operational condition, as defined above, the thermal expansion of the thermowax element 74 of the thermosensitive actuator 65 forces the connected body comprising the case 66, the needle guide member 69, and the valve elements 68 and 71 downwards in the figure against the biasing action of the compression coil spring 76 which is overcome, and forces the valve element 75 upwards in the figure against the biasing action of the compression coil spring 77 which is overcome; so that in this operational condition the thermosensitive actuators 65 and 79 position the valve elements 68, 71, 75, 82, and 85 with relation to the respective valve ports 67, 70, 74, 62, and 84 so that: the valve port 67 is opened, allowing communication between the valve chamber 54b and the valve chamber 56; the valve port 70 is closed, preventing communication between the valve chamber 55 and the valve chamber 56; the valve port 74 is opened, allowing communication between the valve chamber 54a and the valve chamber 55; the valve port 62 is opened, allowing communication between the valve chamber 54b and the valve chamber 57; and the valve port 84 is closed, preventing communication between the valve chamber 54a and the valve chamber 57. Thus, the cooling fluid propelled by the head cooling fluid pump 10 and ejected from its outlet flows through, in order, the head jacket inlet 6, the cooling jacket 4 of the cylinder head 2, the head jacket outlet 7 past the head cooling fluid temperature sensor 132a, the conduit 91, the port 59 of the control valve assembly 50, the valve chamber 55, the valve port 74, the valve chamber 54a, the port 58, the conduit 90, the radiator 15, the conduit 96, and the conduit 95, to be recirculated to the inlet of said block cooling fluid pump 10. On the other hand, the cooling fluid propelled by the block cooling fluid pump 11 and ejected from its outlet flows through, in order, the block jacket inlet 8, the cooling jacket 5 of the cylinder block 3, the block jacket outlet 9 past the clock cooling fluid temperature sensor 133a, the conduit 93, the port 61 of the control valve assembly 50, the valve chamber 57, the valve port 62, the valve chamber 54b, the valve port 67, the valve chamber 56, the port 60, and the conduit 92, to be recirculated to the inlet of said block cooling fluid pump 11. Thus, in this operational condition, the head cooling jacket 4 and the block cooling jacket 5 are included in two independent cooling fluid circuits through which cooling fluid is respectively propelled by the head pump 10 and the block pump 11, with the cooling fluid circuit including the cylinder head cooling jacket 4 also including the radiator 15 in series, while on the other hand the cooling fluid circuit including the cylinder block cooling jacket 5 does not include the radiator 15, and cooling fluid is circulated through the block cooling jacket 5 and the pump 11 and round again without ever being cooled by being passed through said radiator 15; and further at this time no substantial flow takes place through the conduit 94 to mix the cooling fluid flowing in these two independent cooling fluid circuits, since these two circuits are connected together at only one place-the conduit 94.

As in the previously described embodiments, this means that during this warmed up engine operational condition that heat given to the cylinder head 2 by the combustion of fuel in the combustion chambers of the engine 1 is quickly and directly dissipated by transfer to the radiator 15, and accordingly the cylinder head 2 is strongly cooled; while, on the other hand, at this time, the heat given to the cylinder block 3 is not dissipated by any cooling effect of the radiator 15. Thereby, the cylinder head 2 is kept very cool, which increases the mechanical octane value of the engine 1, i.e. helps to prevent knocking and pinking thereof. On the other hand, the cylinder block 3 is allowed to become quite hot, which keeps the temperature of the lubricating oil in the engine 1 high, thus increasing the effectiveness of lubrication of the engine 1, decreasing the wear on the mechanical parts thereof, and decreasing the frictional losses in said engine 1. Again, by this cooling system and method, the output performance of the engine 1, and its fuel economy, are advantageously improved; and also the quality of the exhaust emissions of the engine is improved.

During this engine warmed up operation, when the temperature of the cooling fluid flowing out from the head cooling jacket 5 through the head outlet 7 detected by the head cooling fluid temperature sensor 132a becomes higher than the aforesaid head cooling fluid fan trigger temperature, exemplarily 50° C., then the cooling fan 120 is activated by the electrical control device 132 providing voltage at its terminal "y" which causes the relay switch 131 to be closed, and accordingly the efficiency of cooling provided by the radiator 15 is sharply and substantially increased, thereby cooling down the cylinder head 2 and the cooling fluid therethrough; but when, on the other hand, the temperature of the cooling fluid flowing out from the head cooling jacket 5 through the head outlet 7 detected by the head cooling fluid temperature sensor 132a becomes lower than the aforesaid head cooling fluid fan trigger temperature, then the cooling fan 120 is deactivated by the electrical control device 132 providing no voltage at its terminal "y", thus causing the relay switch 131 to be opened, and accordingly the efficiency of cooling provided by the radiator 15 is sharply and substantially decreased, thereby allowing the cylinder head 2 and the cooling fluid flowing therethrough to warm up again. Thus, by a feedback process as in the other embodiments described, it is expected that during such operation of the engine 1 the temperature of the cooling fluid flowing out from the head cooling jacket 5 through the head outlet 7 as detected by the head cooling fluid temperature sensor 132a will be maintained substantially equal to said head cooling fluid fan trigger temperature, exemplarily 50° C.

Next, suppose that the temperature of the cooling fluid which is flowing out from the block cooling jacket 5 as detected by the block cooling fluid temperature sensor 133a starts to rise past the above defined engine overheating temperature, exemplarily 95° C.; again, this may quite easily occur, since the cylinder block 3 is not being substantially cooled at all during the above outlined operational mode of the cooling system, and this condition indicates incipient overheating of the engine 1. On transition to this condition from the engine not overheating operational condition, as defined above, the thermal expansion of the thermowax element 88 of the thermosensitive actuator 79 forces the connected body comprising the case 80, the needle guide member 83, the rod 81, and the valve elements 82 and 85 to move partly (but not completely) downwards in the figure against the biasing action of the compression coil spring 89 which is overcome, so that in this operational condition the thermosensitive actuators 65 and 79 position the valve elements 68, 71, 75, 82, and 85 with relation to the respective valve ports 67, 70, 74, 62, and 84 so that: the valve port 67 is opened, allowing communication between the valve chamber 54b and the valve chamber 56; the valve port 70 is closed, preventing communication between the valve chamber 55 and the valve chamber 56; the valve port 74 is opened, allowing communication between the valve chamber 54a and the valve chamber 55; the valve port 62 is now only partly opened, allowing now only restricted communication between the valve chamber 54b and the valve chamber 57; and the valve port 84 is now partly opened, allowing some restricted communication between the valve chamber 54a and the valve chamber 57. In this case, the flow pattern explained previously above, in which a cooling fluid circuit including the head cooling jacket 4 and the head pump 10 and and the radiator 15 is provided, and another cooling fluid circuit including the block cooling jacket 5 and the block pump 11 but not including the radiator 15 is provided, is partly maintained, but also a certain mixing of the cooling fluid flowing through these two circuits starts to occur, by a certain part of the flow of cooling fluid flowing from the block jacket outlet 9 past the block cooling fluid temperature sensor 133a, through the conduit 93, through the port 61 of the valve assembly 50, and into the valve chamber 57 now being diverted through the valve port 84 into the valve chamber 54a, so as to be mixed with the flow of cooling fluid which is passing out of the head cooling jacket outlet 7, past the head cooling fluid temperature sensor 132a, and down the conduit 91, through the port 59 of the valve assembly 50, into the valve chamber 55, through the valve port 74, and into said value chamber 54a. Corresponding to this mixing flow of cooling fluid from the block cooling jacket cooling fluid circuit, which passes from the valve chamber 54a out through the port 58 and down the conduit 90 to pass through the radiator 15, a corresponding reverse flow of cooling fluid is diverted from the conduit 96 leading from the outlet of the radiator 15 down through the conduit 94 and through the port 63 of the valve assembly 50, into the valve chamber 54b, to mix with the flow of cooling fluid which is passing through the valve port 62, and to then pass through the valve port 67 and the valve chamber 56 and the port 60 and the conduit 92 to be recirculated to the inlet of said block cooling fluid pump 11. Thus, in this operational condition, the head cooling jacket 4 and the block cooling jacket 5 are included in two partly independent cooling fluid circuits through which cooling fluid is respectively propelled by the head pump 10 and the block pump 11, with the first cooling fluid circuit including the cylinder head cooling jacket 4 also including the radiator 15 in series, while on the other hand the second cooling fluid circuit including the cylinder block cooling jacket 5 does not include the radiator 15, but a certain mixing of the cooling fluid in this second cooling fluid circuit with the cooling fluid in the first cooling fluid circuit is occurring. Hence, a part of the cooling fluid which is being circulated through the block cooling jacket 5 and the pump 11 and round again is being cooled by being passed through said radiator 15.

This means that, during this incipient overheating engine operational condition (i.e., when the engine 1 has started to overheat, but the overheating condition has not progressed to the point at which the valve element actuator assembly 78 has completely switched over), the heat given to the cylinder block 3 is now partially being dissipated by the cooling effect of the radiator 15. Thereby, hopefully, the cylinder block 3 starts to be cooled down gradually; and it is to be hoped that this modest attempt towards cooling down of the cylinder block 3 will be adequate to curb the rise in temperature of the cooling fluid which is flowing out from the block cooling jacket 5 as detected by the block cooling fluid temperature sensor 133a, and will cause said temperature to become less than said engine overheating temperature, exemplarily 95° C., without further rising; if so, then the cooling system will revert to the previously defined operational condition of non-overheated operation. During this engine incipient overheating operational condition, it is to be expected that the temperature of the cooling fluid flowing out from the head cooling jacket 5 through the head outlet 7 detected by the head cooling fluid temperature sensor 132a will naturally be higher than the aforesaid head cooling fluid fan trigger temperature, and accordingly naturally the cooling fan 120 will be being activated by the electrical control device 132 causing the relay switch 130 to be closed; and accordingly the efficiency of cooling provided by the radiator 15 will be at its high level, thereby cooling down the cylinder head 2 and the cooling fluid flowing through the head cooling jacket 4 as quickly as possible, as well as cooling down the cylinder block 3 and the cooling fluid flowing through the block cooling jacket 5. However, if on the contrary the temperature of the cooling fluid flowing out from the head cooling jacket 5 through the head outlet 7 detected by the head cooling fluid temperature sensr 132a is lower than the head cooling fluid fan trigger temperature, then the cooling fan 120 will not be being activated by the electrical control device 132, which will be causing the relay switch 130 to be opened; but this will not cause any particular problem, since a good cooling effect is being provided for the block cooling fluid flow in any case, due to the cool temperature of the head cooling fluid flow with which said block cooling fluid flow is being mixed.

On the other hand, consider the case that the temperature of the cooling fluid which is flowing out from the block cooling jacket 5 as detected by the block cooling fluid temperature sensor 133a has risen quite a way past the above defined engine overheating temperature, exemplarily 95° C.; i.e. suppose that the above described modest attempt towards cooling down of the cylinder block 3 has not been adequate to curb the rise in temperature of the cooling fluid which is flowing out from the block cooling jacket 5 as detected by the block cooling fluid temperature sensor 133a. In this condition, as defined above, the thermal expansion of the thermowax element 88 of the thermosensitive actuator 79 completely forces the connected body comprising the case 80, the needle guide member 83, the rod 81, and the valve elements 82 and 85 to move to its maximum possible extent downwards in the figure against the biasing action of the compression coil spring 89 which is totally overcome, so that in this operational condition the thermosensitive actuators 65 and 79 position the valve elements 68, 71, 75, 82, and 85 with relation to the respective valve ports 67, 70, 74, 62, and 84 so that; the valve port 67 is still opened, allowing communication between the valve chamber 54b and the valve chamber 56; the valve port 70 is still closed, preventing communication between the valve chamber 55 and the valve chamber 56; the valve port 74 is still opened, allowing communication between the valve chamber 54a and the valve chamber 55; the valve port 62 is now completely closed, totally preventing communication between the valve chamber 54b and the valve chamber 57; and the valve port 84 is now completely opened, allowing maximum communication between the valve chamber 54a and the valve chamber 57. In this case, the flow of cooling fluid flowing from the head jacket outlet 7 past the head cooling fluid temperature sensor 132a and along the conduit 91 passes through the port 59 of the valve assembly 50, through the valve chamber 55, through the valve port 74, through the valve chamber 54a, out through the port 58, down the conduit 90, through the radiator 15, and back along the conduit 16 as before, to be recirculated to the inlet of the block cooling fluid pump 10 through the conduits 96 and 95. On the other hand, the flow of cooling fluid flowing from the block jacket outlet 9 past the block cooling fluid temperature sensor 133a and along the conduit 93 and through the port 61 of the valve assembly 50 and into the valve chamber 57 now entirely is passed through the valve port 84, to pass into the valve chamber 54a and to be mixed with the abovementioned head flow of cooling fluid, to then pass through through the radiator 15. A corresponding reverse flow of cooling fluid also occurs through the conduit 94, through the port 63 of the valve assembly 50, into the valve chamber 54b, through the valve port 67, into the valve chamber 56, and out through the port 60 to be recirculated to the inlet of the block cooling fluid pump 11 through the conduit 92. Thus, in this operational condition, the cooling circuits for the head cooling jacket 4 and the block cooling jacket 5 are completely linked. Hence, all the cooling fluid which is being circulated through the block cooling jacket 5 and the pump 11 and round again is cooled by being passed through said radiator 15.

This means that, during this emergency cooling engine operational condition (i.e., when the overheating condition has continued for longer than said critical overheating time period), the heat given to the cylinder block 3 is now as much as possible being dissipated by the cooling effect of the radiator 15. Thereby, definitely, the cylinder block 3 is cooled down quickly and forcibly; and it is practically certain that this cooling effect will be adequate to curb the rise in temperature of the cooling fluid which is flowing out from the block cooling jacket 5 as detected by the block cooling fluid temperature sensor 133a, and will cause said temperature to becomes less than said engine overheating temperature, exemplarily 95° C. During this emergency cooling engine operational condition, of course as before typically the temperature of the cooling fluid flowing out from the head cooling jacket 5 through the head outlet 7 detected by the head cooling fluid temperature sensor 132a will be higher than the aforesaid head cooling fluid fan trigger temperature, and accordingly typically the cooling fan 120 will be being activated by the control device 132 closing the relay switch 130, and accordingly the efficiency of cooling provided by the radiator 15 will typically be at its high level, thereby cooling down the cylinder head 2 and the cooling fluid flowing through the head cooling jacket 4 and also the cylinder block 3 and the cooling fluid flowing through the block cooling jacket 5 as quickly as possible; but, as explained before, if in fact this is not the case, no deleterious effects will ensue.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A cooling system, for an internal combustion engine cooled by flow of cooling fluid and comprising a cylinder head and a cylinder block, comprising:
   (a) a cylinder head cooling jacket through which cooling fluid circulates to cool said cylinder head;
   (b) a cylinder block cooling jacket through which cooling fluid circulates to cool said cylinder block;
   (c) a radiator;
   (d) a cooling fan system for blowing air at said radiator;

(e) a fan system control system which controls said cooling fan system so that it blows air at said radiator either at a relatively high flow amount or at a relatively low flow amount;

(f) a cooling fluid conduit system for circulating cooling fluid through said head cooling jacket, said block cooling jacket, and said radiator in various selectable flow patterns;

(g) a control valve system for thus selectably controlling said circulating flow of controlling fluid in said cooling fluid conduit system;

and (h) a control system for:

(h1) if the temperature of the cooling fluid in said block cooling jacket is less than a certain predetermined engine warmup completion temperature value, so controlling said control valve system as to circulate cooling fluid through a combined circuit of said cooling fluid conduit system including both said head cooling jacket and said block cooling jacket but not substantially including said radiator, and meanwhile so controlling said cooling fan system, via said fan system control system, as to cause said cooling fan system to blow air at said radiator at said relatively low flow amount;

(h2) if the temperature of the cooling fluid in said block cooling jacket is greater than said predetermined engine warmup completion temperature value, then:

(h21) if the temperature of the cooling fluid in said block cooling jacket is less than a certain predetermined engine overheating temperature value which is higher than said predetermined engine warmup completion temperature value, so controlling said control valve system as to circulate cooling fluid through two substantially separate circuits of said cooling fluid conduit system, one including said head cooling jacket and said radiator, and the other including said block cooling jacket without substantially including said radiator;

(h22) if the temperature of the cooling fluid in said block cooling jacket is greater than said predetermined engine overheating temerature value, so controlling said control valve system as to circulate cooling fluid through a combined circuit of said cooling fluid conduit system including said head cooling jacket and said block cooling jacket and also substantially including said radiator;

and (h3) if the temperature of the cooling fluid in said block cooling jacket is greater than a predetermined block fan system trigger temperature value which is equal to or slightly higher than said predetermined engine warmup completion temperature value, then:

(h31) if the temperature of the cooling fluid in said head cooling jacket is less than a certain predetermined head fan system trigger temperature value which is less than said predetermined engine warmup completion temperature value, so controlling said cooling fan system, via said fan system control system, as to cause it to blow air at said radiator at said relatively low flow amount;

and (h32) if the temperature of the cooling fluid in said head cooling jacket is greater than said predetermined head fan system trigger temperature value, so controlling said cooling fan system, via said fan system control system, as to cause it to blow air at said radiator at said relatively high flow amount.

2. A cooling system according to claim 1, wherein said relatively low flow amount is a substantially zero flow amount.

3. A cooling system according to claim 2, wherein:

said control valve system comprises a compound valve comprising: a casing formed with first through fifth valve chambers, said fist valve chamber being communicated with said second second valve chamber via a first valve port, said second valve chamber being communicated with said fifth valve chamber via a second valve port, said first valve chamber being communicated with said third valve chamber via a third valve port, said third second valve chamber being communicated with said fourth valve chamber via a fourth valve port, and said fourth valve chamber being communicated with said fifth valve chamber via a fifth valve port; and first through fifth valve elements each controlling communication through the corresponding one of said first through fifth valve ports;

said cooling fluid conduit system comprises a first conduit communicating said first valve chamber to an inlet of said radiator, a second conduit communicating said second valve chamber to an outlet of said block cooling jacket, a third conduit communicating said third value chamber to an outlet of said head cooling jacket, a fourth conduit communicating said fourth valve chamber to an inlet of said block cooling jacket, a fifth conduit communicating said fifth valve chamber to an outlet of said radiator, and a sixth conduit communicating said fifth valve chamber to an inlet of said head cooling jacket;

and said control system comprises:

a first thermosensitive actuator responsive to the temperature in said second valve chamber and for, when said temperature in said second valve chamber is less than said predetermined engine overheatng temperature value, moving said first valve element to close said first valve port and moving said second valve element to open said second valve port; while, when said temperature in said second valve chamber is greater than said predetermined engine overheating temperature value, moving said first valve element to open said first valve port and moving said second valve element to close said second valve port;

a second thermosensitive actuator responsive to the temperature in said fourth valve chamber and for, when said temperature in said fourth valve chamber is less than said predetermined engine warmup temperature value, moving said third valve element to close said third valve port, moving said fourth valve element to open said fourth valve port, and moving said fifth valve element to close said fifth valve port; while, when said temperature in said fourth valve chamber is greater than said predetermined engine warmup temperature value, moving said third valve element to open said third valve port, moving said fourth valve element to close said fourth valve port, and moving said fifth valve element to open said fifth valve port;

a head cooling fluid temperature sensor for sensing the temperature of the cooling fluid circulating through said head cooling jacket and for outputting a signal representative thereof, and a block cooling fluid temperature sensor for sensing the temperature of the cooling fluid circulating through said block cooling jacket and for outputting a signal representative thereof;

and a control mechanism, for actuating said cooling fan system when the output signal from said head cooling fluid temperature sensor is indicative of a head cooling fluid temperature higher than said predetermined head fan system trigger temperature value and also the output signal from said block cooling fluid temperature sensor is indicative of a block cooling fluid temperture higher than said predetemined block fan system trigger temperature value, and for otherwise deactuating said cooling fan system.

4. A cooling system according to claim 1, wherein said predetermined block fan system trigger temperature value is substantially equal to said predetermined engine warmup completion temperature value.

5. A cooling system according to claim 1, wherein said fan system control system can control said cooling fan system so that it blows air at
said radiator either at a relatively low flow amount, at a first relatively high flow amount, or at a second relatively high flow amount which is higher than said first relatively high flow amount, and wherein said control system further is for, if the temperature of the cooling fluid in said block cooling jacket is greater than said predetermined block fan system trigger temperature value:
if the temperature of the cooling fluid in said head cooling jacket is less than said predetermined head fan system trigger temperature value, controlling said cooling fan system, via said fan system control system, so as to cause it to blow air at said radiator at said relatively low flow amount;
but if the temperature of the cooling fluid in said head cooling jacket is greater than said predetermined head fan system trigger temperature value, controlling said cooling fan system, via said fan system control system, so as to cause it to blow air at said radiator at said first relatively high flow amount if the temperature of the cooling fluid in said block cooling jacket is less than said predetermined engine overheating temperature value, and at said second relatively high flow amount if the temperature of the cooling fluid in said block cooling jacket is greater than said predetermined engine oveheating temperature value.

6. A cooling system according to claim 1 or claim 5, wherein said cooling fan system consists of just one cooling fan, and no other cooling fan is provided for blowing air at the radiator.

7. A cooling system according to claim 6, wherein said cooling fan is electrically powered.

8. A cooling system according to claim 7, wherein said relatively low flow amount is a substantially zero flow amount, and wherein said fan system control system comprises an ON/OFF switching device which controls supply of electrical energy to power said fan.

9. A cooling system according to claim 7, wherein said relatively low flow amount is a substantially zero flow amount, and wherein said fan system control system comprises a variable power supply device which controls supply of electrical energy to power said fan.

10. A cooling system according to claim 6, wherein said cooling fan is rotatively powered from a crankshaft of said internal combustion engine.

11. A cooling system according to claim 10, wherein said fan system control system comprises a clutching device which controls supply of rotary power from said crankshaft to power said fan.

12. A cooling system according to claim 5, wherein said cooling fan system consists of a plurality of cooling fans.

13. A cooling system according to claim 12, wherein said cooling fans are electrically powered.

14. A cooling system according to claim 1, wherein said control system comprises a head cooling fluid temperature sensor for sensing the temperature of the cooling fluid circulating through said head cooling jacket and for outputting a signal representative thereof, and a block cooling fluid temperature sensor for sensing the temperature of the cooling fluid circulating through said block cooling jacket and for outputting a signal representative thereof.

15. A cooling system according to claim 14, wherein said control system controls said fan system control system and said control valve system, based upon said output signals from said head cooling fluid temperature sensor and said block cooling fluid temperature sensor.

16. A method of operating a cooling system, for an internal combustion engine cooled by flow of cooling fluid and comprising a cylinder head and a cylinder block, comprising (a) a cylinder head cooling jacket through which cooling fluid circulates to cool said cylinder head; (b) a cylinder block cooling jacket through which cooling fluid circulates to cool said cylinder block; (c) a radiator; (d) a cooling fan system for blowing air at said radiator; (e) a fan system control system which controls said cooling fan system so that it blows air at said radiator either at a relatively high flow amount or at a relatively low flow amount; (f) a cooling fluid conduit system for circulating cooling fluid through said head cooling jacket, said block cooling jacket, and said radiator in various selectable flow patterns; and (g) a control valve system for thus selectably controlling said circulating flow of cooling fluid in said cooling fluid conduit system;

said method comprising the processes, simultaneously performed, of:

(h) if the temperature of the cooling fluid in said block cooling jacket is less than a certain predetermined engine warmup completion temperature value, so controlling said control valve system as to circulate cooling fluid through a combined circuit of said cooling fluid conduit system including both said head cooling jacket and said block cooling jacket but not substantially including said radiator; but if the temperature of the cooling fluid in said block cooling jacket is greater than said predetermined engine warmup completion temperature value:

(h1) if the temperature of the cooling fluid in said block cooling jacket is less than a certain predetermined engine overheating temperature value which is higher than said predetermined engine warmup completion temperature value, so controlling said control valve system as to circulate cooling fluid through two substantially separate circuits of said cooling fluid conduit system, one including said head cooling jacket and said radiator, and the other including said block cooling jacket without substantially including said radiator;

or (h2) if the temperature of the cooling fluid in said block cooling jacket is greater than said predetermined engine overheating temperature value, so controlling said control valve system as to circulate cooling fluid through a combined circuit of said cooling fluid conduit system including said head cooling jacket and said block cooling jacket and also substantially including said radiator;

and (i) if the temperature of the cooling fluid in said block cooling jacket is less than a predetemined block fan system trigger temperature value which is equal to or slightly higher than said predetermined engine warmup completion temperature value, then so controlling said cooling fan system, via said fan system control system, as to cause said cooling fan system to blow air at said radiator at said relatively low flow amount; but if the temperature of the cooling fluid in said block cooling jacket is greater than said predetermined block fan system trigger temperature value, then:

(i1) if the temperature of the cooling fluid in said head cooling jacket is less than a certain predetermined head fan system trigger temperature value which is lower than said predetermined engine warmup completion temperature value, so controlling said cooling fan system, via said fan system control system, as to cause it to blow air at said radiator at said relatively low flow amount;

or (i2) if the temperature of the cooling fluid in said head cooling jacket is greater than said predetermined head fan system trigger temperature value, so controlling said cooling fan system, via said fan system control system, as to cause it to blow air at said radiator at said relatively high flow amount.

17. A method of operating a cooling system according to claim 16, wherein said relatively low flow amount is a substantially zero flow amount.

18. A method of operating a cooling system according to claim 16, wherein said predetermined block fan system trigger temperature value is substantially equal to said predetermined engine warmup completion temperature value.

19. A method, according to claim 16, of operating a cooling system wherein said fan system control system can control said cooling fan system so that it blows air at said radiator either at a relatively low flow amount, at a first relatively high flow amount, or at a second relatively high flow amount which is higher than said first relatively high flow amount, wherein, if the temperature of the cooling fluid in said block cooling jacket is greater than said predetermined block fan system trigger temperature value:

if the temperature of the cooling fluid in said head cooling jacket is less than said predetermined head fan system trigger temperature value, said cooling fan system is so controlled, via said fan system control system, as to cause it to blow air at said radiator at said relatively low flow amount;

but if the temperature of the cooling fluid in said head cooling jacket is greater than said head predetermined fan system trigger temperature value, said cooling fan system is so controlled, via said fan system control system, as to cause it to blow air at said radiator at said first relatively high flow amount if the temperature of the cooling fluid in said block cooling jacket is less than said predetermined engine overheating temperature value, and at said second relatively high flow amount if the temperature of the cooling fluid in said block cooling jacket is greater than said predetermined engine overheating temperature value.

20. A method of operating a cooling system, according to claim 16, said control system comprising a head cooling fluid temperature sensor for sensing the temperature of the cooling fluid circulating through said head cooling jacket and for outputting a signal representative thereof and a block cooling fluid temperature sensor for sensing the temperature of the cooling fluid circulating through said block cooling jacket and for outputting a signal representative thereof, wherein said fan system control system and said control valve system are controlled based upon said output signals from said head cooling fluid temperature sensor and said block cooling fluid temperature sensor.

* * * * *